US009332250B2

(12) United States Patent  
Sugita et al.

(10) Patent No.: US 9,332,250 B2  
(45) Date of Patent: May 3, 2016

(54) DISPLAY DEVICE

(75) Inventors: Tatsuya Sugita, Takahagi (JP); Shinichiro Oka, Hitachi (JP); Shinichi Komura, Mobara (JP); Toshio Miyazawa, Chiba (JP); Terunori Saitou, Mobara (JP); Miyuki Sugita, legal representative, Takahagi (JP)

(73) Assignee: Japan Display Inc., Tokyo (JP)

(*) Notice: Subject to any disclaimer, the term of this patent is extended or adjusted under 35 U.S.C. 154(b) by 740 days.

(21) Appl. No.: 13/568,929

(22) Filed: Aug. 7, 2012

(65) Prior Publication Data

US 2013/0038811 A1 Feb. 14, 2013

(30) Foreign Application Priority Data

Aug. 12, 2011 (JP) ................................. 2011-177038

(51) Int. Cl.
| | |
|---|---|
| *G02F 1/1335* | (2006.01) |
| *H04N 13/04* | (2006.01) |
| *G02B 27/22* | (2006.01) |
| *G02B 3/12* | (2006.01) |
| *G02B 27/26* | (2006.01) |
| *G02F 1/29* | (2006.01) |

(52) U.S. Cl.  
CPC .............. *H04N 13/0404* (2013.01); *G02B 3/12* (2013.01); *G02B 27/22* (2013.01); *G02B 27/2214* (2013.01); *G02B 27/26* (2013.01); *H04N 13/0454* (2013.01); *G02F 2001/294* (2013.01)

(58) Field of Classification Search  
USPC .......................................................... 349/15  
See application file for complete search history.

(56) References Cited

U.S. PATENT DOCUMENTS

| 7,855,756 | B2 | 12/2010 | Hong et al. | |
|---|---|---|---|---|
| 7,978,151 | B2 | 7/2011 | Taira et al. | |
| 8,350,899 | B2 | 1/2013 | Takahashi et al. | |
| 8,502,930 | B2 | 8/2013 | Im | |
| 2005/0012879 | A1* | 1/2005 | Lin | 349/114 |
| 2009/0190048 | A1* | 7/2009 | Hong et al. | 349/15 |

(Continued)

FOREIGN PATENT DOCUMENTS

| JP | 8-101367 A | 4/1996 |
|---|---|---|
| JP | 2004-258631 A | 9/2004 |
| JP | 2005-134689 A | 5/2005 |
| JP | 2010-211036 A | 9/2010 |
| JP | 2010-224191 A | 10/2010 |

(Continued)

OTHER PUBLICATIONS

Hirota, Kaori; Final Office Action issued in corresponding Japanese Patent Application No. 2011-177038; dated Sep. 11, 2014; 7 pages, including English-language translation.

*Primary Examiner* — Lucy Chien  
(74) *Attorney, Agent, or Firm* — Ulmer & Berne LLP

(57) ABSTRACT

In order to provide a display device capable of improving the display quality at the time of 2D display and 3D display, the present invention provides a display device that includes: a display panel that displays an image; and a liquid crystal lens panel that is arranged on the display surface side of the display panel, controls a refractive index in a cylindrical lens manner to form parallax barriers, and switches 2D display and 3D display, and the liquid crystal lens panel includes: a first transparent substrate that is arranged on the display panel side; a second transparent substrate that is arranged to face the first substrate through a liquid crystal layer; and a first polarizing plate that is formed on the display surface side of the second transparent substrate to control a polarization direction of light transmitting through the liquid crystal lens panel.

11 Claims, 18 Drawing Sheets

(56) References Cited

U.S. PATENT DOCUMENTS

2009/0316059 A1* 12/2009 Kim et al. .................. 349/15
2010/0238276 A1   9/2010 Takagi et al.
2011/0157498 A1   6/2011 Kim et al.

FOREIGN PATENT DOCUMENTS

| KR | 2009-0045842 A | 5/2009 |
| KR | 2011-0077708 A | 7/2011 |
| KR | 2011-0077709 A | 7/2011 |

* cited by examiner

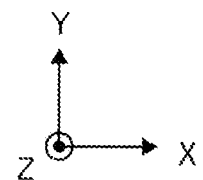

DISPLAY DEVICE

CLAIM OF PRIORITY

The present application claims priority from Japanese Patent Application JP2011-177038 filed on Aug. 12, 2011, the content of which is hereby incorporated by reference into this Application.

BACKGROUND OF THE INVENTION

1. Field of the Invention

The present invention relates to a display device, and particularly to a liquid crystal lens-type 3D display device in which a liquid crystal display panel having a lens function is arranged on the display surface side of a display panel for displaying an image.

2. Description of the Related Art

A display device by which an image can be viewed by switching two-dimensional (2D) display and three-dimensional (3D) display by naked eyes without using eyeglasses includes, for example, a first liquid crystal display panel that displays an image, and a second liquid crystal display panel that is arranged on the display surface side (viewer side) of the first liquid crystal display panel to form a parallax barrier allowing different rays to enter the right and left eyes of a viewer at the time of 3D display. In such a liquid crystal display device in which 2D display and 3D display can be switched, the orientation of liquid crystal molecules of the second liquid crystal display panel is controlled, so that a refractive index in the second liquid crystal display panel is changed, areas for lenses (lenticular lenses, cylindrical lens arrays or the like, generically referred to as cylindrical lenses) that extend in the vertical direction of the display surface and are provided in parallel in the horizontal direction are formed, and light of pixels corresponding to the right and left eyes is sorted to view points of the viewer.

As the liquid crystal lens-type 3D display device with such a configuration, there is, for example, a 3D image display device described in Japanese Patent Application Laid-Open No. 2010-224191 (corresponding US Patent Application Publication No. 2010/0238276A1). In the display device described in the publication, comb-like electrodes are formed at a pair of upper and lower transparent substrates that are arranged to face each other through a liquid crystal layer. With this configuration, voltage applied to the electrodes of the upper and lower transparent substrates is controlled to be able to control the switching of 2D display and 3D display, and the number of parallaxes can be controlled at the time of 3D display.

SUMMARY OF THE INVENTION

However, the refractive index distribution of a liquid crystal lens has been imperfect in the liquid crystal lens-type 3D display device. Therefore, there is a concern that so-called crosstalk in which a parallax image displayed only for a predetermined eye can be seen by the other eye occurs at the time of 3D display. If the crosstalk occurs, an image for the other eye that is not supposed to be seen is displayed while being overlapped. Accordingly, the quality of 3D display is largely deteriorated, and thus it has been desired to reduce the crosstalk.

The present invention has been achieved in view of the above-described problems, and an object of the present invention is to provide a technique capable of reducing crosstalk at the time of 3D display in a display device using liquid crystal lenses.

In order to solve the above-described problems, the present invention provides a display device that includes: a display panel that displays an image; and a liquid crystal lens panel that is arranged on the display surface side of the display panel, controls a refractive index in a cylindrical lens manner to form parallax barriers, and switches 2D display and 3D display, and the liquid crystal lens panel includes: a first transparent substrate that is arranged on the display panel side; a second transparent substrate that is arranged to face the first substrate through a liquid crystal layer; and a first polarizing plate that is formed on the display surface side of the second transparent substrate to control a polarization direction of light transmitting through the liquid crystal lens panel.

According to the present invention, it is possible to reduce crosstalk at the time of 3D display in a display device using liquid crystal lenses.

The other effects of the present invention will become apparent from the description of the entire specification.

DETAILED DESCRIPTION OF THE INVENTION

Figure 1:
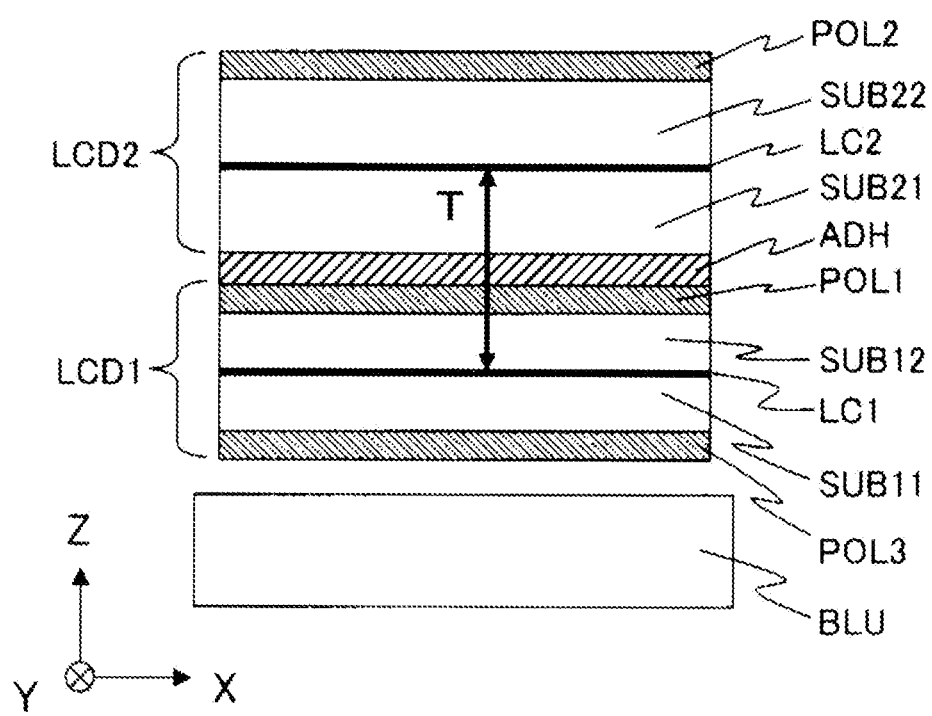
FIG. 1 is a cross-sectional view for explaining a configuration of a liquid crystal display device as a display device according to a first embodiment of the present invention.

Hereinafter, embodiments to which the present invention is applied will be described using the drawings.

The following examples show concrete examples of the embodiments of the present invention. The present invention is not limited to the examples, but can be variously changed and modified by those skilled in the art within the range of technical ideas disclosed in the specification.

Further, constitutional elements having the same functions are given the same reference numerals in the all drawings for explaining the examples, and thus the explanations thereof will not be repeated in some cases.

Further, X, Y, and Z shown in the drawings represent an X-axis, a Y-axis, and a Z-axis, respectively. The arrangements of the X-axis, Y-axis, and Z-axis shown in FIG. 9A, FIG. 10A, FIG. 11A, FIG. 12A, FIG. 14A, FIG. 15A, and FIG. 16A are the same in FIGS. 9B to 9D, FIGS. 10B to 10D, FIGS. 11B to 11D, FIGS. 12B to 12D, FIGS. 14B to 14D, FIGS. 15B to 15D, and FIGS. 16B to 16D, respectively, and thus they are not shown.

First Embodiment

FIG. 1 is a cross-sectional view for explaining the entire configuration of a liquid crystal display device as a display device according to a first embodiment of the present invention, and the entire configuration of the display device of the first embodiment will be described on the basis of FIG. 1. In the following description, there will be described a case in which a non-luminous first liquid crystal display panel (liquid crystal panel) LCD1 is used as a display panel to display an image. However, as a display panel to display an image, another non-luminous display panel, or a self-luminous display panel such as an organic EL display panel or a plasma display panel may be used. Further, each thin film can be formed by a well-known photolithographic technique. Thus, a detailed explanation for the formation method is omitted.

The liquid crystal display device of the first embodiment includes a first liquid crystal display panel LCD1 that is a liquid crystal display panel for image display and a second liquid crystal display panel (liquid crystal lens panel) LCD2 that controls the refractive index of transmitted light to function as lenses (lenticular lenses, cylindrical lens arrays or the like). As shown in FIG. 1, the liquid crystal display device of the first embodiment having the configuration is configured in such a manner that a backlight unit (backlight device) BLU, the first liquid crystal display panel LCD1, and the second liquid crystal display panel LCD2 are arranged while being laminated in this order. Specifically, the second liquid crystal display panel LCD2 is arranged on the display surface side (viewer side) of the first liquid crystal display panel LCD1. In this case, in order to prevent misalignment of the first liquid crystal display panel LCD1 and the second liquid crystal display panel LCD2, the first liquid crystal display panel LCD1 and the second liquid crystal display panel LCD2 are fixed to each other using hybrid resin ADH serving as adhesive material.

It should be noted that the hybrid resin ADH is made of well-known resin material with a refractive index substantially equal to that of transparent substrates (such as glass substrates) used as first substrates SDB11 and SUB21 and second substrates SUB12 and SUB22. Further, the first liquid crystal display panel LCD1 and the backlight unit BLU have well known configurations, and thus an optical sheet such as a diffuser panel is not illustrated. Furthermore, a well-known protective film or a front-face plate, or a well-known touch panel may be provided on the display surface side of the second liquid crystal display panel LCD2.

The second liquid crystal display panel LCD2 of the first embodiment is formed using a liquid crystal display panel in which, for example, liquid crystal molecules are homogeneously oriented, a pair of well-known transparent substrates (the first substrate SUB21 and the second substrate SUB22) such as glass substrates are arranged to face each other, and liquid crystal LC2 is sandwiched between the first substrate (first transparent substrate) SUB21 and the second substrate (second transparent substrate) SUB22. Further, a polarizing plate (polarizing plate for a lens, or first polarizing plate) POL2 is arranged on the display surface side of the second liquid crystal display panel LCD2, namely, on the display surface side of the second substrate SUB22. It should be noted that the polarization direction of the polarizing plate POL2 will be described later in detail.

Comb electrodes (linear electrodes and strip electrodes) are formed on the first substrate SUB21, and plate-like common electrodes are formed on the second substrate SUB22. In the case where the comb electrodes and the common electrodes are the same in electric potential, no electric field is applied to the liquid crystal layer LC2 to perform 2D display that allows display light (display image) from the first liquid crystal display panel LCD1 to directly transmit (pass through). Further, in the case where different voltage, namely, alternating voltage is applied to the comb electrodes and the common electrodes and electric field is applied to the liquid crystal layer LC2, 3D display (naked-eye 3D display) that uses the lens action of a parallax barrier to provide binocular parallax in which display light from the first liquid crystal display panel LCD1 differently enters the right and left eyes of a viewer is performed. As described above, the second liquid crystal display panel LCD2 of the first embodiment operates as a liquid crystal display panel that allows incident light (display light of the first liquid crystal display panel LCD1) to directly transmit in a state where no electric field is applied to the liquid crystal. Although there is a TN-type liquid crystal display panel, as the second liquid crystal display panel LCD2, in which liquid crystal molecules are homogeneously oriented, another liquid crystal display panel in which liquid crystal molecules are homogeneously oriented may be used.

Further, the first liquid crystal display panel LCD1 of the first embodiment is a well-known IPS (In-Plane Switching)-type liquid crystal display panel, and is configured in such a manner that a pair of well-known transparent substrates (the first substrate SUB11 and second substrate SUB12) such as glass substrates are arranged to face each other through a liquid crystal layer LC1. Well-known thin-film transistors, linear electrodes, common electrodes and the like are formed on the first substrate SUB11, and color filters, well-known black matrixes, and the like are formed on the second substrate SUB12. In this case, for example, the first substrate SUB11 is formed using a transparent substrate larger than the second substrate SUB12 in size, and connection terminals and the like to be connected to the outside are formed at surrounding areas. Further, fixing of the first substrate SUB11 and the second substrate SUB12 and sealing of the liquid crystal therebetween are realized using well-known seal material that is circularly coated along the surrounding areas of the second substrate SUB12. Further, a polarizing plate (lower polarizing plate) POL3 is arranged on the backlight device side (the surface facing that on the liquid crystal side) of the first substrate SUB11, a polarizing plate (upper polarizing plate) POL1 is arranged on the display surface side (the surface facing that on the liquid crystal side) of the second substrate SUB12, and the polarizing plate POL1 and the polarizing plate POL3 are arranged in a crossed nichols manner in which the polarization directions form 90°.

However, the polarizing plate POL2 is arranged on the display surface side of the second liquid crystal display panel LCD2 in the liquid crystal display device of the first embodiment. Thus, it is only necessary to obtain desired contrast using the polarizing plate POL1 and the polarizing plate POL2, a polarizing plate with a low polarization degree can be used for the polarizing plate POL1 or the polarizing plate POL2, and the polarizing plate POL1 and the polarizing plate POL2 can be different from each other in the polarization degree. Thus, a normal film-like polarizing plate with a high polarization degree (a polarizing plate with a large polarization degree) is used as the polarizing plate POL1 or the polarizing plate POL2 in the liquid crystal display device of the first embodiment. However, the polarizing plate is not limited to the film polarizing plate, but may be, for example, a coating-type polarizing plate. The display device can be made thinner using such a thin-film polarizing plate. In the case where a thin-film polarizing plate such as a coating-type polarizing plate is used as the polarizing plate POL1, it is possible to obtain particular effects in which the liquid crystal layer LC2 for a lens and the liquid crystal layer LC1 for display can be arranged close to each other. Further, it is only necessary for the polarizing plate POL2 to have a polarization degree by which crosstalk can be effectively reduced. It is possible to obtain particular effects in which the amount of light transmitting through the polarizing plate POL2 can be increased by using a polarizing plate that is lower in the polarization degree and is higher in the transmissivity than the polarizing plate POL1.

Further, the first liquid crystal display panel LCD1 is not limited to the IPS-type liquid crystal display panel, but may be another liquid crystal display panel such as a TN-type liquid crystal display panel or a VA (Vertical Alignment)-type liquid crystal display panel, so that the incident polarization direction to the second liquid crystal display panel LCD2 becomes linear polarization in a desired direction. For example, in the case of using another liquid crystal display panel as the first liquid crystal display panel LCD1, if the polarization direction of display light from the first liquid crystal display panel LCD1 is different from linear polarization in a direction to be described later, a phase-contrast member may be provided between the polarizing plate POL2 and the liquid crystal layer LC2 so that the polarization direction becomes the linear polarization in a desired direction.

Figure 2:
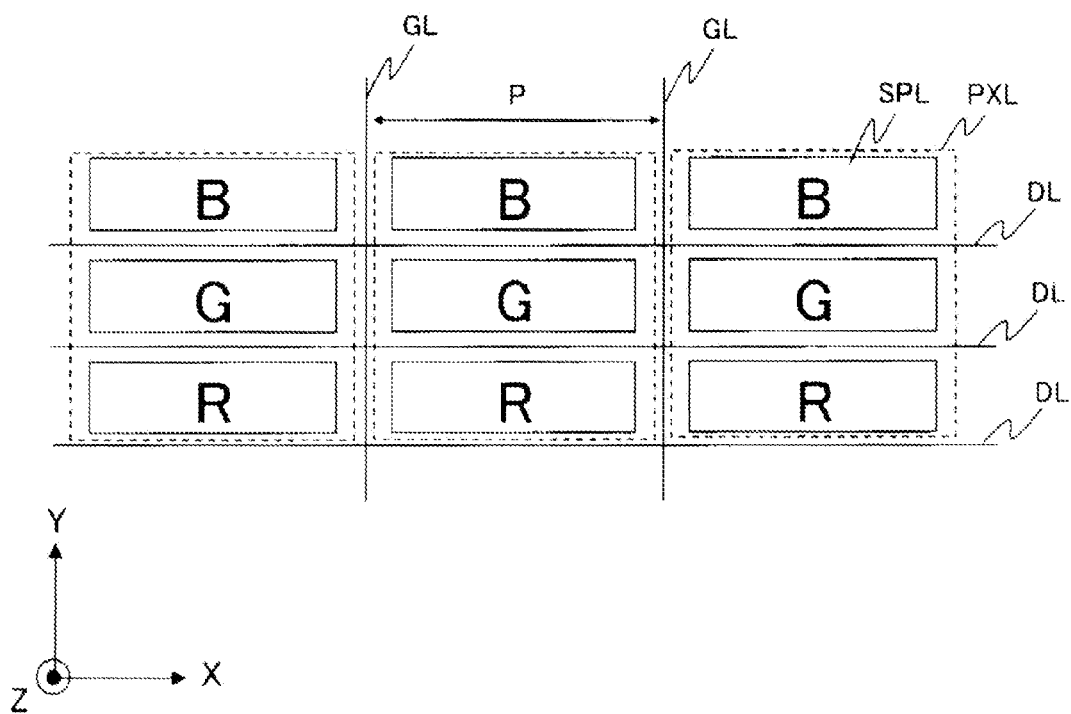
FIG. 2 is a plan view for explaining a pixel configuration in the liquid crystal display device according to the first embodiment of the present invention.

As shown in FIG. 2, for example, scanning signal lines (gate lines) GL that extend in the Y-direction and are provided in parallel in the X-direction and video signal lines (drain lines) DL that extend in the X-direction and are provided in parallel in the Y-direction are formed in a display area that is the surface on the liquid crystal side of the first substrate SUB11 in the first liquid crystal display panel LCD1 of the first embodiment. Rectangular areas surrounded by the drain lines DL and the gate lines GL correspond to red (R), green (G), and blue (B) color filters formed on the second substrate SUB12, and pixel areas (hereinafter, abbreviated as pixels) PXL each having three subpixels SPL shown by RGB in FIG. 2 are arranged in matrix in the display area. In this case, cylindrical lens-like liquid crystal lenses are formed along long comb electrodes PX extending in the Y-direction in the first embodiment, and thus the subpixels SPL of RGB are provided in parallel in the Y-direction. However, the direction in which the subpixels SPL of RGB are provided in parallel is not limited to the Y-direction, but another arrangement in which the subpixels SPL of RGB are provided in parallel in the X-direction may be employed.

The respective subpixels SPL are connected to, for example, thin-film transistors (not shown) that are turned on by a scanning signal from the gate lines GL and source electrodes of the thin-film transistors, and include linear electrodes to which a video signal that is a tone signal (tone voltage) from the drain lines DL is supplied. Further, in the case of the IPS-type liquid crystal display panel, common electrodes to which a common signal having reference electric potential for the electric potential of the tone signal is supplied are provided on the first substrate SUB11 where the thin-film transistors are formed. However, in the case of the VA-type or TN-type liquid crystal display panel, common electrodes are formed together with color filters on the side of the second substrate SUB12.

It should be noted that an area where the pixels PXL for color display having the subpixels of red (R), green (G), and blue (B) are formed serves as a display area in an area where the liquid crystal is sealed in the liquid crystal display panel LCD1 of the first embodiment. Thus, an area where no pixels are formed and that is not related to display is not a display area even in the area where the liquid crystal is sealed.

<Configuration of First Liquid Crystal Display Panel>

Figure 3:
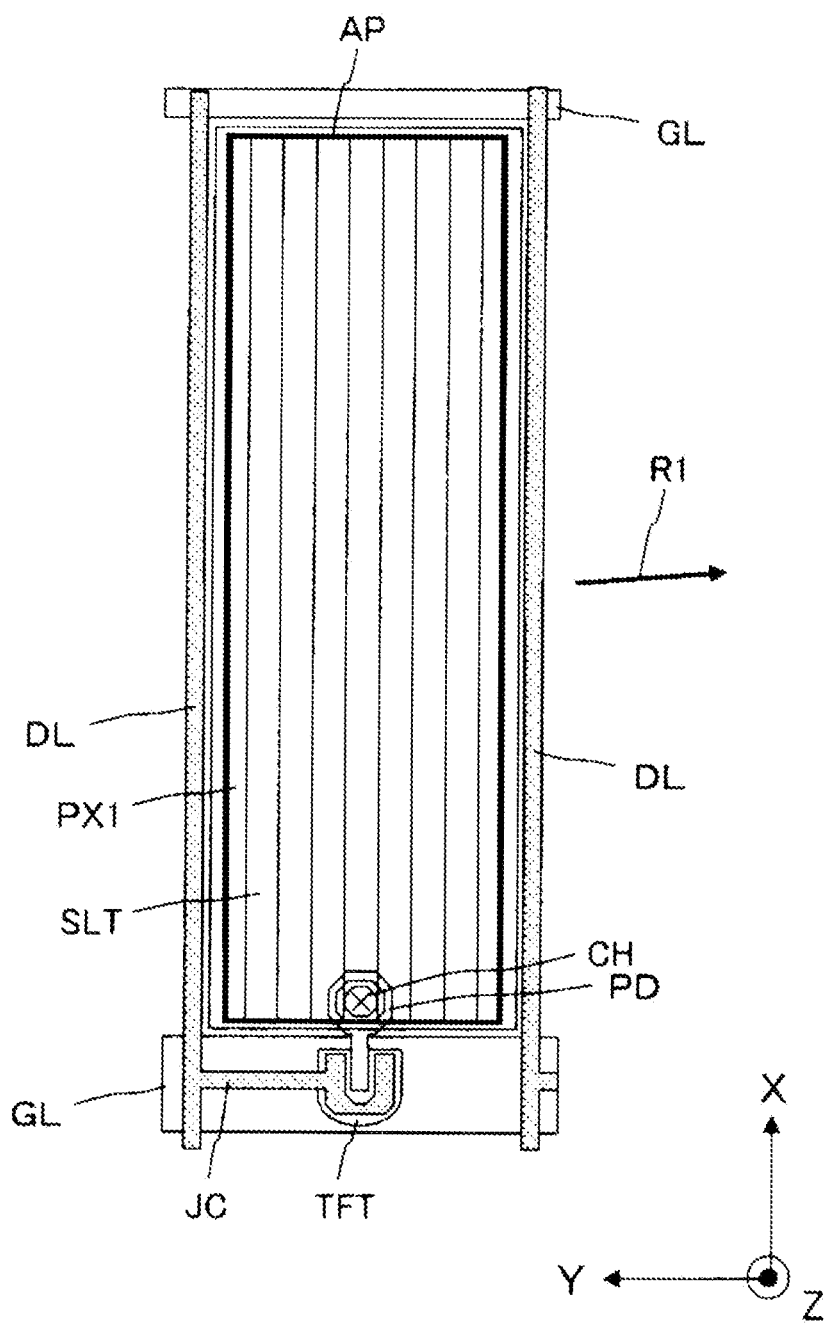
FIG. 3 is a plan view for explaining a configuration of a subpixel of a first liquid crystal display panel in the liquid crystal display device according to the first embodiment of the present invention.

FIG. 3 is a top surface view for explaining a configuration of the subpixel of the first liquid crystal display panel in the liquid crystal display device according to the first embodiment of the present invention. Hereinafter, a structure of the subpixel in the liquid crystal display panel LCD1 of the first embodiment will be described on the basis of FIG. 3. However, only the first substrate SUB11 is illustrated in FIG. 3 to simplify the explanation, and a well-known oriented film is not illustrated to show only the orientation direction (rubbing direction) thereof.

As shown in FIG. 3, the areas surrounded by the gate lines GL that extend in the Y-direction and are provided in parallel in the X-direction and the drain lines DL that extend in the X-direction and are provided in parallel in the Y-direction serve as the subpixel areas in the liquid crystal display panel LCD1 of the first embodiment. With such a configuration, the pixels are formed in matrix in the liquid crystal display device of the first embodiment. Further, flat common electrodes (not shown) made of transparent conductive material such as ITO (Indium-Tin-Oxide) are formed on the surface (opposite face)

of the liquid crystal side of the first substrate SUB11 in the liquid crystal display device of the first embodiment. The common electrodes of the first substrate SUB11 are formed while being overlapped with common lines that supply a common signal as a reference of image signals at edge parts of the first substrate SUB11. Accordingly, the common electrodes are electrically connected to the common lines. It should be noted that the gate lines GL and the drain lines DL are formed using metal thin films in the first embodiment, but may be formed using transparent conductive films.

Further, an extension part (connection part) JC extending on the thin-film transistor TFT side is provided at a part of each drain line DL stretching in the X-direction, and the extension part JC is connected to the drain electrode of the thin-film transistor TFT. The source electrode of the thin-film transistor TFT is formed while having an extension part slightly extending on the pixel area side, and the extension part is configured to reach a pad part PD connected to linear electrodes PX1. It should be noted that the thin-film transistor TFT is a transistor with an MIS (Metal Insulator Semiconductor) structure as a so-called inverted staggered structure in which the gate lines GL are used as gate electrodes. Further, the transistor with the MIS structure is driven so as to switch the drain electrode and the source electrode by the applied bias. For convenience sake, the side connected to the drain lines DL is referred to as the drain electrode and the side connected to the linear electrodes PX1 is referred to as the source electrode in the specification.

The common electrodes are formed at the pixel areas of the first substrate SUB11, and the linear electrodes PX1 are formed on the above layer through an insulating film (not shown) that functions as a dielectric film of a capacitive element. A contact hole CH reaching the pad part PD is formed at the insulating film, and the linear electrodes PX1 and the source electrode of the thin-film transistor TFT are electrically connected to each other through the contact hole CH.

The linear electrodes PX1 of the first embodiment are formed in such a manner that after a transparent conductive film made of, for example, ITO is formed in a planar shape in the subpixel area, plural slits SLT intersecting with the Y-direction are formed at parts corresponding to passing areas AP of backlight, and linear electrodes overlapped with the common electrodes are formed in the passing areas AP. Further, the formation angles (inclined angles relative to the Y-direction) of all the slits SLT are the same (for example, 0 to 10°) in one subpixel area in the first embodiment, and thus the inclined angles of the linear electrodes in the passing areas AP become the same, so that a so-called single domain configuration is employed. With this configuration, the inclined angles of the linear electrodes relative to the rubbing direction shown by the arrow R1 in the drawing are equalised in the first liquid crystal display panel LCD1 of the first embodiment. It should be noted that the linear electrodes PX1 of the first embodiment are configured so that end portions of each slit SLT are not opened. However, the present invention is not limited to this configuration, but one end or both ends of each slit SLT may be opened.

<Configuration of Second Liquid Crystal Display Panel>

Figure 4:
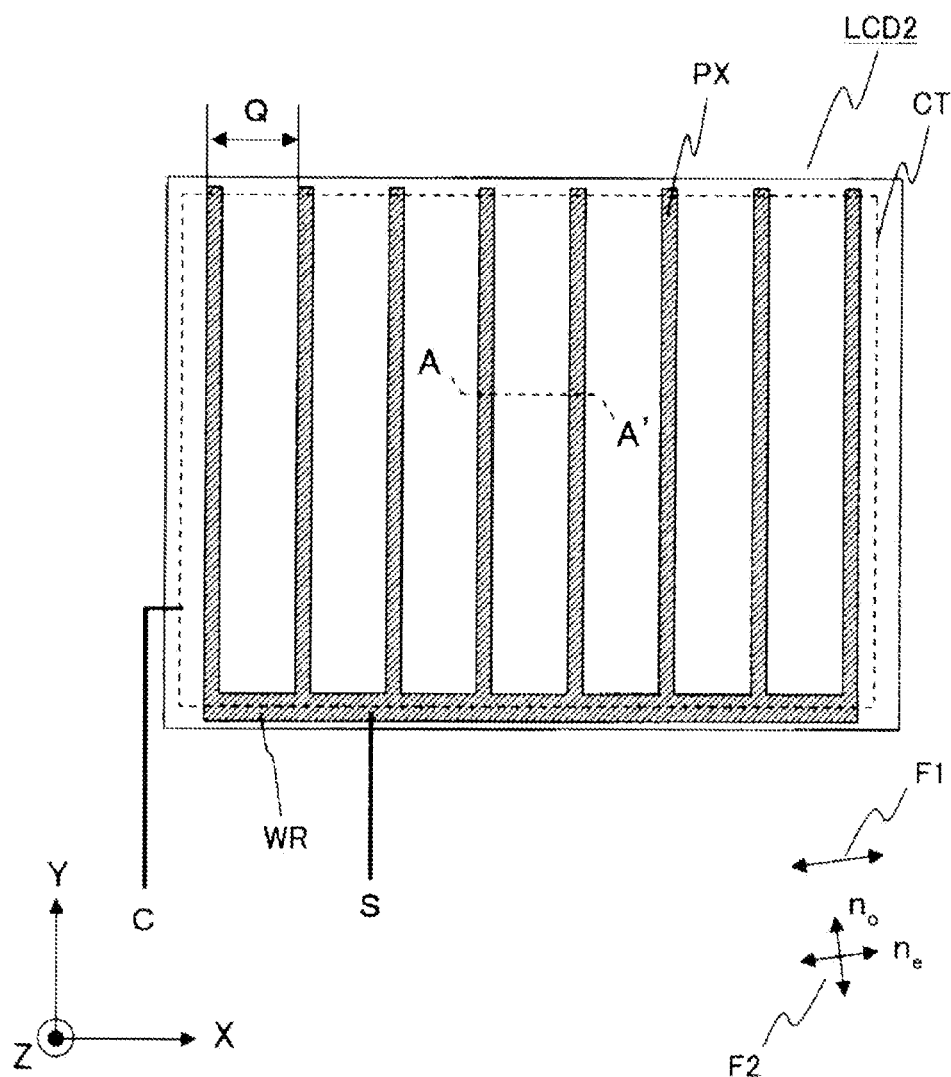
FIG. 4 is a plan view for explaining a configuration of a second liquid crystal display panel in the liquid crystal display device according to the first embodiment of the present invention.
Figure 5:
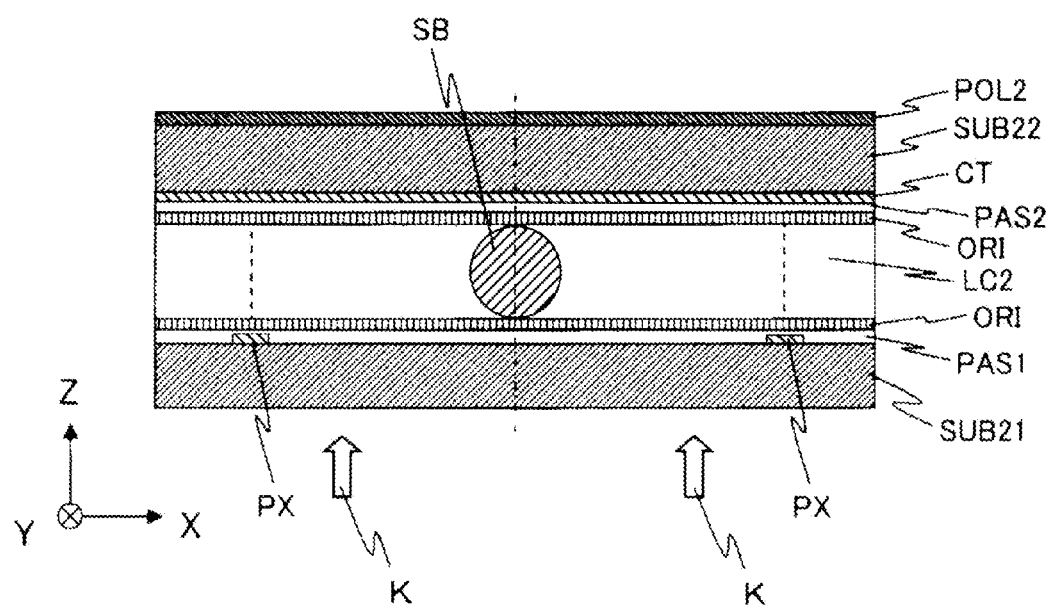
FIG. 5 is a cross-sectional view taken along the line A-A' shown in FIG. 4.

FIG. 4 is a plan view for explaining a detailed configuration of the second liquid crystal display panel in the display device according to the first embodiment of the present invention, and FIG. 5 is a cross-sectional view taken along the line A-A' shown in FIG. 4.

As shown in FIG. 4, plural comb electrodes PX that extend in the Y-direction and are provided in parallel in the X-direction are formed on the liquid crystal surface side of the first substrate SUB21 in the second liquid crystal display panel LCD2 of the first embodiment. Further, a wiring part WR is formed on the first substrate SUB21 while extending in the X-direction along one marginal part of the long sides of the second liquid crystal, display panel LCD2, and one end of each comb electrode PX is electrically connected to the wiring part WR. The comb electrodes PX and the wiring part WR are formed using, for example, ITO (Indium Tin Oxide) or ZnO (Zinc Oxide) transparent conductive films. However, the films used for the comb electrodes PX and the wiring part WR are not limited to the transparent conductive films, but may be nontransparent conductive thin films such as metal thin films of aluminum or the like.

In this case, the display light from the first liquid crystal display panel LCD1, namely, the light passing through the second polarizing plate POL1 is polarized in the direction shown by the arrow F1, and the display light enters the second liquid crystal display panel LCD2. Accordingly, the angle of the polarization direction (incident polarisation direction) of the light (display light) entering the second liquid crystal display panel LCD2, namely, the transmission axis direction of the polarizing plate POL1 relative to each comb electrode PX is 80 to 90° (0 to 10° relative to the direction which corresponds to the long side (X-direction) of the second liquid crystal display panel LCD2 and in which the cylindrical lenses are provided in parallel). Further, the liquid crystal molecules of the liquid crystal layer LC2 are oriented to be substantially in parallel with the incident polarization direction F1, so that attenuation of the display light caused by transmission through the second liquid crystal display panel LCD2 can be reduced.

On the other hand, in the second liquid crystal display panel LCD2 of the first embodiment, there occurs disorder of refractive index distribution accompanied by disclination, namely, orientation disorder of liquid crystal molecules at the liquid crystal area overlapped with the comb electrodes PX at the time of 3D display. Further, a refractive index elliptical member is disordered in the axis direction by the disclination, and thus the linearly-polarized light entering the liquid crystal area is converted into elliptically-polarized light. Scattering by the disclination and the polarization components of elliptical polarization causes crosstalk. The crosstalk components generated by the disclination become the elliptically-polarized light to be emitted from the liquid crystal layer LC2. Therefore, some of these crosstalk components are absorbed by the polarizing plate POL2 in the present invention, so that the crosstalk between the display light for the right eye and the display light for the left eye is reduced. Accordingly, as will be described later, the orientation direction (initial orientation direction) of the liquid crystal molecules of the liquid crystal layer LC2 and the transmission axis direction of the polarizing plate POL2 relative to the incident polarization direction F1 are appropriately set in the second liquid crystal display panel. LCD2, so that the crosstalk at the time of 3D display is reduced. It should be noted that a rubbing process (orientation process) is performed for the liquid crystal molecules of the second liquid crystal display panel LCD2 of the first embodiment so as to be oriented substantially in parallel with the incident polarization direction. Accordingly, the rubbing angle relative to each comb electrode PX is 80 to 90° in the second liquid crystal display panel LCD2, and the long axis direction of the liquid crystal molecules of the liquid crystal layer LC2 is oriented in the incident polarization direction shown by the allow F1. However, the orientation process for the liquid crystal molecules is not limited to the rubbing process, but, for example, an oriented film for which the rubbing process is not necessary may be used for an oriented film ORI. It should foe noted that as shown by the arrow F1 in the drawing, the long axis direction of the liquid crystal molecules, namely, the refractive index (refractive index of an extraordinary ray) in the orientation direction becomes $n_e$, and the refractive index (refractive index of an ordinary ray) in the direction orthogonal thereto becomes $n_o$.

Further, as shown in FIG. 5, the comb electrodes PX are formed on the liquid crystal surface side of the first substrate SUB21 which light (display light) K from the first liquid crystal display panel LCD1 enters from the rear face side in the second liquid crystal display panel LCD2 of the first embodiment. An insulating film PAS1 is formed so as to cover upper faces of the comb electrodes PX, and the oriented film ORI is formed thereabove.

Further, a flat (plate-like) common electrode CT is formed on the liquid crystal surface side of the second substrate SUB22 that is arranged to face the first substrate SUB21 through the liquid crystal layer LC2. On the upper layer of the common electrode CT, an insulating film PAS2 is formed to cover the common electrode CT, and the oriented film ORI is formed on the upper layer thereof. On the other hand, the polarizing plate POL2 is formed on the display surface side that is opposed to the liquid crystal surface side of the second substrate SUB22.

Furthermore, spacer beads SB as spacer members to keep an interval (gap) between the first substrate SUB21 and the second substrate SUB22 at a predetermined interval (for example, an interval of about 20 to 100 μm is necessary) are dispersed at an area between the first substrate SUB21 and the second substrate SUB22 that are arranged to face each other through the liquid crystal layer LC2. The spacer beads SB are formed using translucent resin material. In particular, the spacer beads SB are formed using resin material with the same refractive index as the refractive index $n_e$ of the extraordinary ray of the liquid crystal layer LC2. The spacer beads SB are formed using such resin material, so that it is difficult for a viewer to recognise the spacer beads SB. However, scattering light from the spacer beads SB causes crosstalk. The polarisation state of the scattering light is changed. However, a part thereof is absorbed by the polarizing plate POL2 in the first embodiment, and thus the crosstalk caused by the scattering light can be reduced.

With the above-described configuration, the cylindrical lenses that extend in the Y-direction are formed at areas between the comb electrodes PX that are arranged adjacent to each other and the lenticular cylindrical lens arrays that are provided in parallel in the X-direction are formed at the time of 3D display using the second liquid crystal display panel LCD2 of the first embodiment. In this case, the area where the cylindrical lens arrays of the second liquid crystal display panel LCD2 are formed is an area corresponding to the display area of the first liquid crystal display panel LCD1. As a result, in the case where both of the right and left eyes of a viewer are aligned in the X-direction, light of different pixels, namely, images of different view points can be sorted to both of the right and left eyes of the viewer to enable stereophonic viewing in the liquid crystal display device of the first embodiment.

<2D Display Operation and 3D Display Operation>

Figure 6:
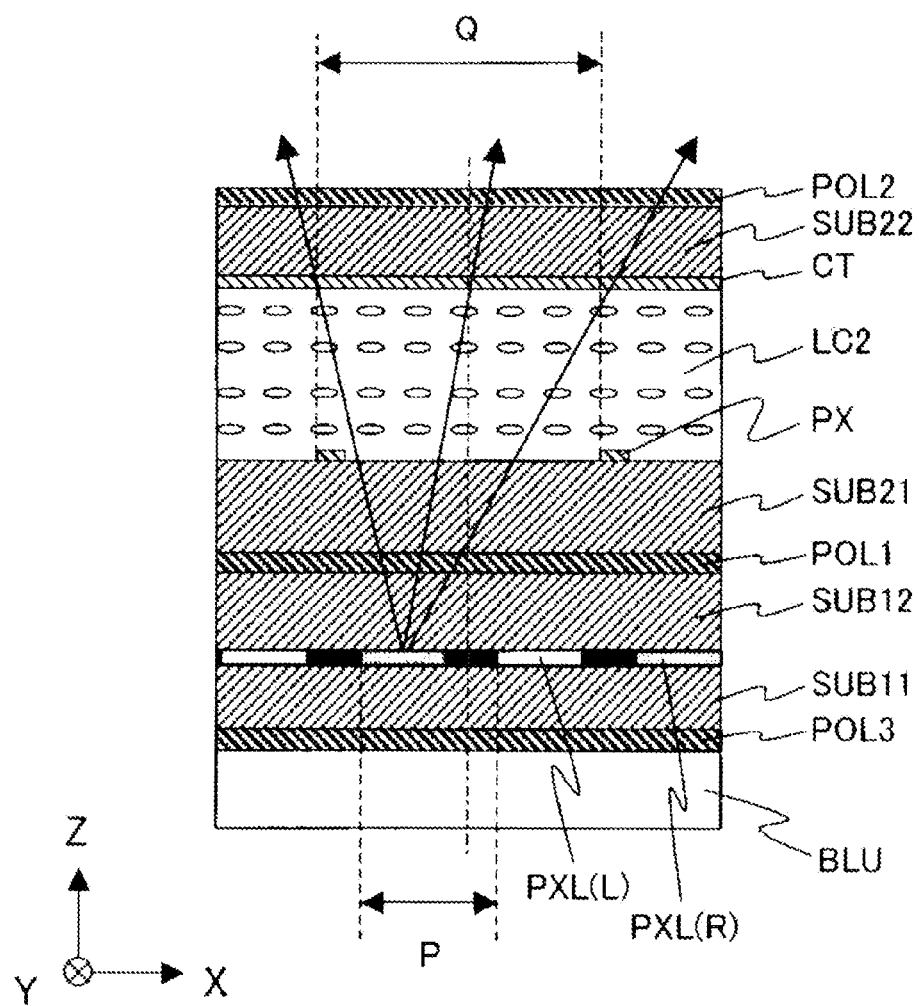
FIG. 6 is a cross-sectional view for explaining a 2D display operation in the liquid crystal display device according to the first embodiment of the present invention.
Figure 7:
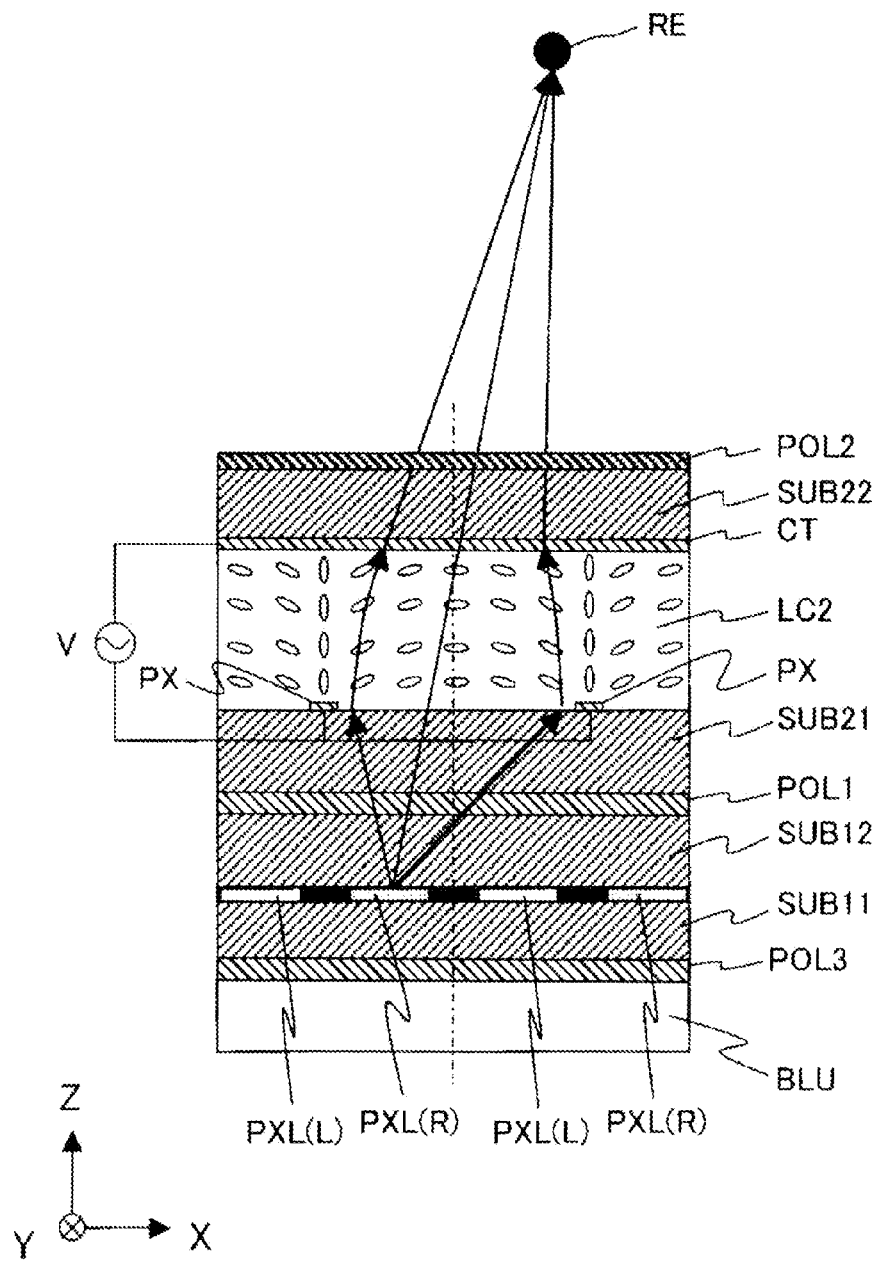
FIG. 7 is a cross-sectional view for explaining a 3D display operation in the liquid crystal display device according to the first embodiment of the present invention.

Next, FIG. 6 shows a cross-sectional view for explaining a 2D display operation in the liquid crystal display device according to the first embodiment of the present invention, and FIG. 7 shows a cross-sectional view for explaining a 3D display operation in the liquid crystal display device according to the first embodiment of the present invention. Hereinafter, the display operation in the liquid crystal display device of the first embodiment will be described on the basis of FIG. 6 and FIG. 7. It should be noted that each of FIG. 6 and FIG. 7 is a cross-sectional view of the liquid crystal display device taken along the line A-A' shown in FIG. 4. Further, in FIG. 6 and FIG. 7, homogeneous orientation is realized by adjusting a rubbing angle b1 of the oriented film ORI formed on the first substrate SUB21 and a rubbing angle b2 of the oriented film ORI formed on the second substrate SUB22 to the same angle, and the rubbing angles b1 and b2 are formed to be the same as a transmission axis angle (first transmission axis angle) a1 of the polarizing plate POL1. Accordingly, the angle relative to each comb electrode PX becomes closer to a right angle. Further, the oriented film ORI, the insulating films PAS1 and PAS2 and the like are not illustrated in FIG. 6 and FIG. 7 to simplify the explanation.

As shown in FIG. 6 and FIG. 7, the comb electrodes PX are formed on the liquid crystal surface side of the first substrate SUB21 and the common electrode CT is formed on the liquid crystal surface side of the second substrate SUB22 in the second liquid crystal display panel LCD2 of the first embodiment. Further, two pixels PXL are arranged between the comb electrodes PX that are adjacent to each other in the X-direction. With this configuration, one pixel PXL positioned at right or left of each comb electrode PX serves as a pixel PXL(L) for the left eye, and the other pixel PXL serves as a pixel PXL(R) for the right eye. An interval between the adjacent comb electrodes PX, namely, a comb electrode pitch Q in the X-direction is determined on the basis of an interval between the pixel PXL(L) for the left eye and the pixel PXL (R) for the right eye, namely, a pixel pitch P in the X-direction, a visual distance, a distance between LC2 and LC1, and the number of view points. In the case of two view points as in the first embodiment, the liquid crystal display device of the first embodiment is formed using the pixel pitch P and the comb electrode pitch Q satisfying $Q \approx 2P$.

As shown in FIG. 6, at the time of 2D display in which an electric potential difference between the comb electrodes PX and the common electrode CT is 0 volt, namely, the same voltage is applied to the comb electrodes PX and common electrode CT, the liquid crystal molecules LC2 in the second liquid crystal display panel LCD2 stay in an initial orientation state. In this case, the orientation direction (long axis direction (direction of the refractive index $n_e$ of the extraordinary ray shown by the arrow F2 of FIG. 4)) of the liquid crystal molecules of the liquid crystal layer LC2 is in parallel with the incident polarization direction shown by the arrow F1, namely, the first transmission axis angle a1 of the polarizing plate POL1. In this case, the liquid crystal layer LC2 does not act on the incident light, and thus the light entering the liquid crystal layer LC2 directly transmits, and is emitted through the polarizing plate POL2. As a result, the display light (shown by the arrows in the drawing) from the all pixels PXL of the first liquid crystal display panel LCD1 reaches the right and left eyes of a viewer, and an image of 2D display can be recognized. It should be noted that the same is true in the case where the liquid crystal molecules are twisted using TN liquid crystal for the liquid crystal layer LC2, and 2D display is performed because the light entering the liquid crystal layer LC2 is subjected to the same action on the entire surface of the liquid crystal layer LC2.

On the other hand, as shown in FIG. 7, in the case where alternating voltage V is applied between the comb electrodes PX and the common electrode CT and electric field is generated between each comb electrode PX and the common electrode CT that are arranged to face each other through the liquid crystal layer LC2, the orientation direction of the liquid crystal molecules is controlled in accordance with the intensity of the electric field, and orientation distribution is generated on the liquid crystal layer LC2. In the orientation distribution, the liquid crystal molecules at areas where the comb electrodes PX overlap with the common electrode CT rise, and the refractive index of the liquid crystal layer LC2 near the comb electrodes PX becomes small. Thus, the liquid crystal layer LC2 acts as convex lenses each with an area between the comb electrodes set as the center. As a result, plural cylindrical lenses that extend in the Y-direction and are provided in parallel in the X-direction are formed in the second liquid crystal display panel LCD2.

Here, in the case of two view points, the pixel PXL(R) for the right eye and the pixel PXL(L) for the left eye are alternately arranged in the alignment direction of the cylindrical lenses, namely, in the X-direction. As a result, as shown by the arrows in FIG. 7, the display light from the pixel PXL (R) for the right eye reaches only the right eye of the viewer shown at the focal position RE in FIG. 7. Similarly to the above, the display light from the pixel PXL(L) for the left eye reaches only the left eye of the viewer. Specifically, the display light from the pixel PXL(R) for the right eye and the display light from the pixel PXL(L) for the left eye are separated from each other to be imaged, and thus 3D display can be obtained. It should be noted that the same is true in the case where the liquid crystal molecules are twisted using TN liquid crystal for the liquid crystal layer LC2. The optical path length becomes long, and the liquid crystal layer LC2 acts as convex lenses each with an area between the comb electrodes set as the center. Thus, 3D display can be obtained. Further, the case of two view points has been described above. However, the present invention can be similarly applied to the case of three or more view points.

However, since the polarizing plate POL2 is provided on the display surface side of the second liquid crystal display panel LCD2 having a phase difference in the present invention, coloring caused by the phase difference of the liquid crystal layer LC2 is likely to occur. In order to reduce the coloring, it is desirable to have a large phase difference by increasing a cell gap d of the liquid crystal layer LC2.

For example, the following equation (1) is obtained in consideration of the dependency of a wavelength $\lambda$ of $\Delta n$ (refractive index anisotropy) of the liquid crystal material while a wavelength on the short wavelength side of the main wavelength area used for display is represented, as $\lambda_1$ and a wavelength on the long wavelength side is represented as $\lambda_2$.

[Formula 1]

$$\left(\frac{\Delta n(\lambda_1)}{\lambda_1} - \frac{\Delta n(\lambda_2)}{\lambda_2}\right)d \geq M \quad (1)$$

It should be noted that M is an integer of 1 or larger, and 2 or larger is desirable.

Here, in the case where the wavelength dispersion of $\Delta n$ is small, the equation (2) is obtained using a wavelength $\lambda_3$ of $\lambda_1 < \lambda_3 < \lambda_2$.

[Formula 2]

$$\left(\frac{1}{\lambda_1} - \frac{1}{\lambda_2}\right)\Delta n(\lambda_3)d \geq M \quad (2)$$

In the equation (2), for example, $\lambda_1$=450 nm and $\lambda_2$=600 nm are satisfied as the wavelength $\lambda_1$ on the short wavelength side and the wavelength $\lambda_2$ on the long wavelength side, and $\lambda_3$ is set at a high spectral sensitivity of 550 nm. Further, in the case of $\Delta n$=0.2, it is desirable that the cell gap d be 9 μm or larger using the equation (2) in order to satisfy M=1. Further, it is desirable that the cell gap d be 18 μm or larger in order to satisfy M=2.

Figure 8:
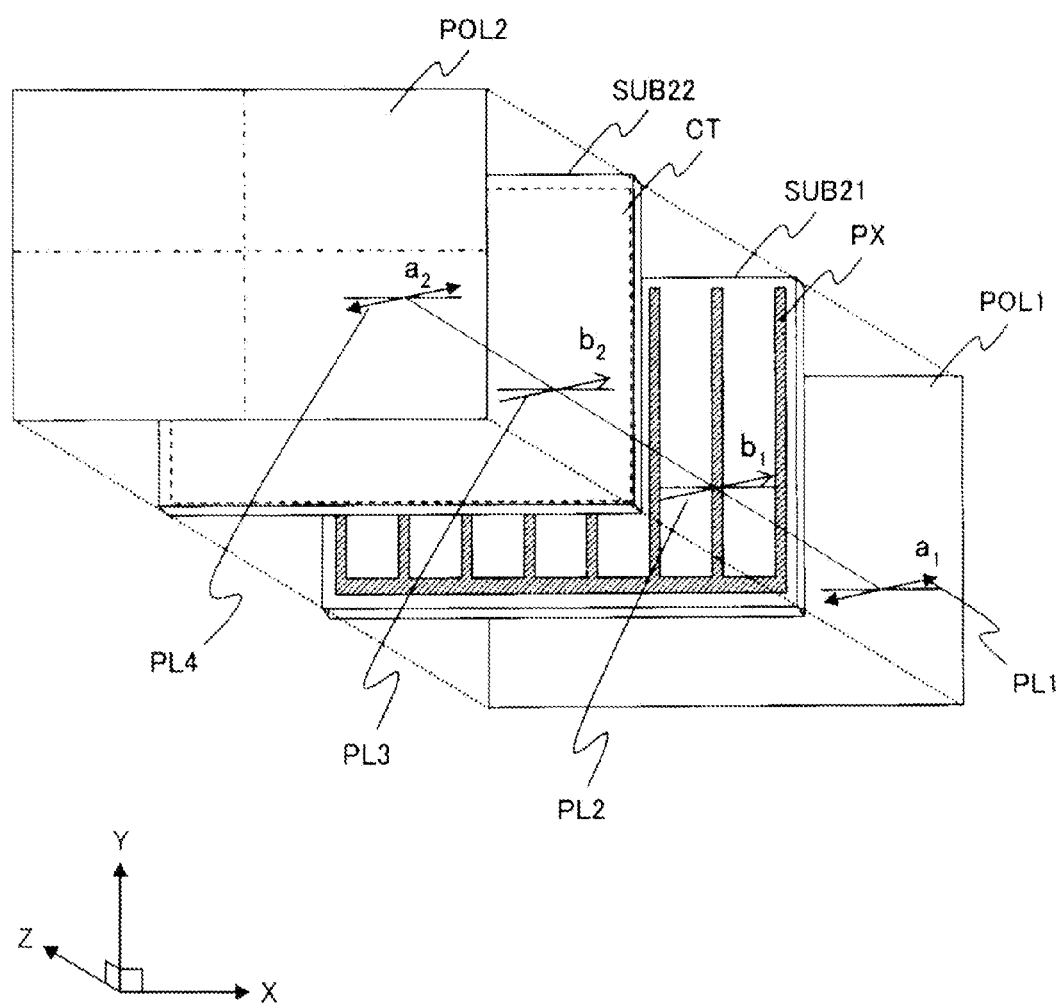
FIG. 8 is an outline view for explaining a relation between transmission axis angles related to liquid crystal lens characteristics in the second liquid crystal display panel in the liquid crystal display device according to the first embodiment of the present invention.
Figure 9A:
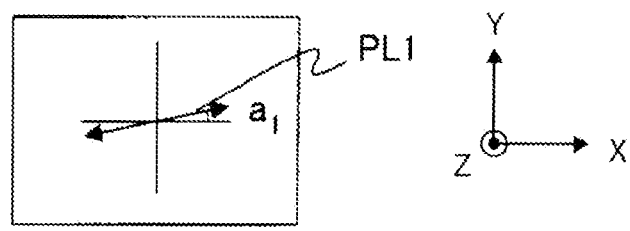
FIGS. 9A to 9D are outline views for explaining a relation between the transmission axis angles and the rubbing angles in a first example in the liquid crystal display device according to the first embodiment of the present invention.
Figure 9B:
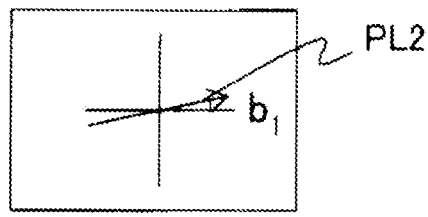
Figure 9C:
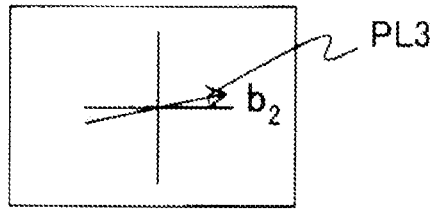
Figure 9D:
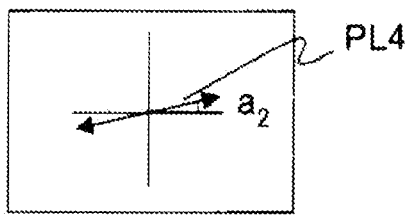
Figure 10A:
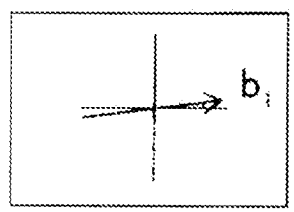
FIGS. 10A to 10D are outline views for explaining a relation between the transmission axis angles and the rubbing angles in a second example in the liquid crystal display device according to the first embodiment of the present invention.
Figure 10B:
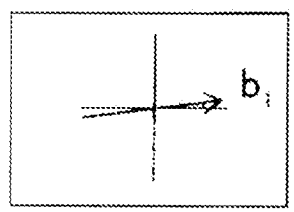
Figure 10C:
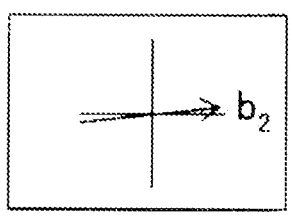
Figure 10D:
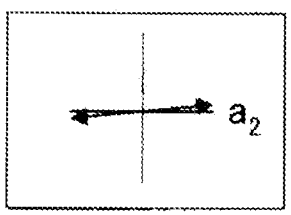
Figure 11A:
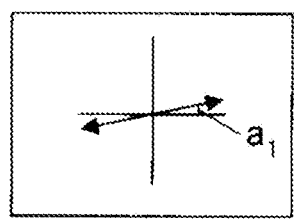
FIGS. 11A to 11D are outline views for explaining a relation between the transmission axis angles and the rubbing angles in a third example in the liquid crystal display device according to the first embodiment of the present invention.
Figure 11A:
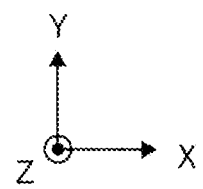
Figure 11B:
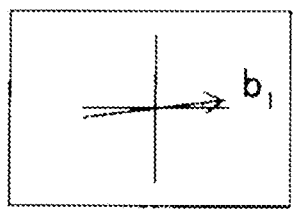
Figure 11C:
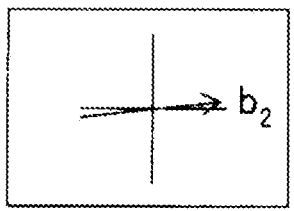
Figure 11D:
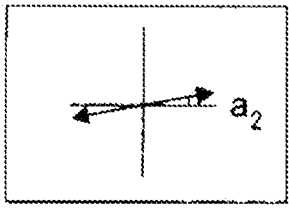
Figure 12A:
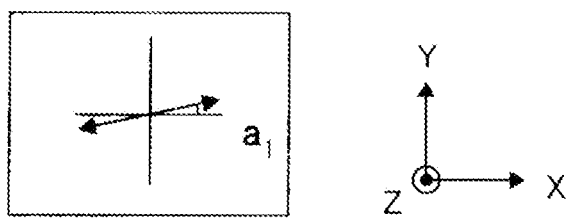
FIGS. 12A to 12D are outline views for explaining a relation between the transmission axis angles and the rubbing angles in a fourth example in the liquid crystal display device according to the first embodiment of the present invention.
Figure 12B:
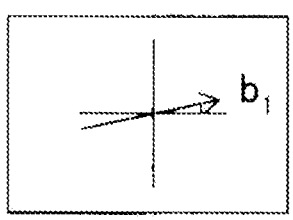
Figure 12C:
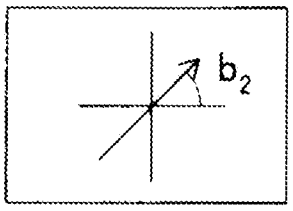
Figure 12D:
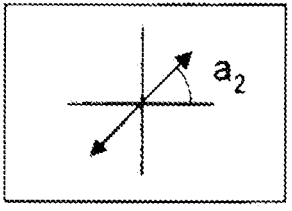

FIG. 8 is a diagram for explaining a relation between the transmission axis angles related to liquid crystal lens characteristics in the second liquid crystal display panel in the liquid crystal display device according to the first embodiment of the present invention, and the lens characteristics in the second liquid crystal display panel LCD2 of the first embodiment will be described below in detail on the basis of FIG. 8. It should be noted in the following description that the arrows PL1, PL2, PL3, and PL4 represent the transmission axis of the polarizing plate POL1, the rubbing axis (first rubbing axis) of the first substrate SUB21, the rubbing axis (second rubbing axis) of the second substrate SUB22, and the transmission axis of the polarizing plate POL2, respectively.

As shown in FIG. 8, the light (display light) emitted from the first liquid crystal display panel LCD1 becomes linearly-polarized light at the polarizing plate POL1 pasted on the display surface side of the first liquid crystal display panel LCD1, and enters the liquid crystal layer LC2 through the first substrate SUB21 configuring the second liquid crystal display panel LCD2. In this case, the angle (first transmission axis angle a1) of the transmission axis PL1 of the polarizing plate POL1 falls within a range of $0° < a1 \leq 10°$ (preferably, a range of $3° \leq a1 \leq 8°$) relative to the X-direction in the first liquid crystal display panel LCD1 of the first embodiment. Accordingly, the display light entering the first substrate SUB21 becomes linearly-polarized light whose first transmission axis angle a1 falls within a range of $0° < a1 \leq 10°$ relative to the X-direction.

Further, the oriented film ORI of the first substrate SUB21 is formed in such a manner that the angle (first rubbing angle b1) of the first rubbing axis PL2 falls within a range of $0° \leq b1 \leq 10°$ (preferably, a range of $3° \leq b1 \leq 8°$) relative to the X-direction. Accordingly, the display light entering the first substrate SUB21 enters the liquid crystal layer LC2 along the direction of the liquid crystal molecules having the first rubbing angle b1. The display light entering the liquid crystal layer LC2 is modulated or polarized in accordance with the alignment direction of the liquid crystal molecules corresponding to 2D display or 3D display. However, an experiment of the inventors shows that when the first rubbing angle b1 is 0°, domains are easily generated around the comb electrodes PX. In order to suppress the generation of the domains, it is desirable to form the first rubbing angle b1 larger than 0°.

The display light modulated at the liquid crystal, layer LC2 enters from the liquid crystal layer LC2 to the second substrate SUB22 along the direction of the liquid crystal molecules oriented in the rubbing direction formed on the oriented film ORI of the second substrate SUB22. In this case, a rubbing process with a predetermined rubbing angle (second rubbing angle) b2 is performed for the oriented film ORI of the second substrate SUB22, and thus the display light in the polarization direction of the second rubbing axis PL3 along the liquid crystal molecules oriented along the direction of the second rubbing angle b2 is emitted from the liquid crystal layer LC2 to the second substrate SUB22. In this case, the display light emitted from the liquid crystal layer LC2, namely, the display light entering the second substrate SUB22 from the liquid crystal layer LC2 becomes display light polarized by transmitting through the spacer beads SB as spacer members or polarized by the disclination at the time of 3D display.

The display light entering the second substrate SUB22 from the side of the liquid crystal layer LC2 is emitted from the display surface of the second substrate SUB22 to enter the polarizing plate POL2 pasted on the display surface side. In this case, the angle (second transmission axis angle a2) of the transmission axis PL4 of the polarizing plate POL2 falls within a range of $0°<a2≤10°$ (preferably, a range of $3°≤a2≤8°$) relative to the X-direction. Accordingly, the display light emitted from the polarizing plate POL2 to the display surface side, namely, the display light emitted from the second liquid crystal display panel LCD2 becomes linearly-polarized display light matching the second transmission axis angle a2. As a result, parallax images from the pixels corresponding to the right and left eyes of a viewer enter the corresponding opposed eyes even at the time of 3D display in the liquid crystal display device of the first embodiment. Thus, the generation of the crosstalk can be suppressed, and the image quality of 3D display can be significantly improved.

Further, even in the case where the rubbing axis PL2 of the first substrate SUB21, the rubbing axis PL3 of the second substrate SUB22, and the transmission axis PL4 of the polarizing plate POL2 are misaligned, the crosstalk caused by the misalignment can be absorbed by the polarizing plate POL2, and thus the crosstalk is hardly increased. As a result, it is possible to obtain particular effects in which margins of the axis misalignment of the rubbing axis PL2 of the first substrate SUB21, the rubbing axis PL3 of the second substrate SUB22, and the transmission axis PL4 of the polarizing plate POL2 can be increased.

Further, the polarizing plate POL2 is arranged on the display surface side in the liquid crystal display device of the first embodiment. Thus, even in the case where light (outside light) is irradiated on the display surface side, the light that does not match the direction of the transmission axis PL4 of the polarizing plate POL2, namely, the second transmission axis angle a2 is absorbed by the polarizing plate POL2. Further, UV-reducing characteristics additionally provided at the polarizing plates prevent UV light deteriorating the liquid crystal from reaching the liquid crystal layer LC2. Thus, it is possible to obtain particular effects in which deterioration of the liquid crystal layer LC2 can be considerably reduced without additionally providing a UV-reducing film or the like, and the reliability of the liquid crystal display device can be considerably improved.

Further, in the relation between the transmission axis angles related to liquid crystal lens characteristics in the second liquid crystal display panel shown in FIG. 8, it is possible to maximize the amount of light transmitting through the polarizing plate POL2 when second rubbing angle b2=second transmission axis angle a2. Thus, the brightness can be enhanced. Further, when first transmission axis angle a1=second transmission axis angle a2, the crosstalk can be reduced. Further, when first rubbing angle b1=second rubbing angle b2, the amount of light transmitting through the polarizing plate POL2 can be increased because the polarization direction of the display light is not rotated in the liquid crystal layer LC2. On the other hand, when first rubbing angle b1≠second rubbing angle b2, the polarization direction of the display light emitted from the second liquid crystal display panel LCD2 serving as liquid crystal lenses can be arbitrarily set because the polarization direction of the display light can be rotated in the liquid crystal layer LC2.

Further, when first transmission axis angle a1≠0°, it is desirable to satisfy first transmission axis angle a1≥first rubbing angle b1≥0°. Further, it is more desirably to satisfy first transmission axis angle a1=first rubbing angle b1. Furthermore, in order to suppress the generation of the domains in the second liquid crystal display panel LCD2, first rubbing angle b1≠0° is desirable. It is preferable that the first rubbing angle b1 be 1° or larger and 10° or smaller, more preferably, 3° or larger and 8° or smaller. Moreover, when first rubbing angle b1=second rubbing angle b2=second transmission axis angle a2, the transmission axis PL4 of the polarizing plate POL2 is arranged to form the crossed nichols with the transmission axis of the polarizing plate POL3, so that 2D display and 3D display can be performed without using the polarizing plate POL1.

As described above, the parallax barriers are formed at the first liquid crystal display panel LCD1 for image display and on the display surface side of the first liquid crystal display panel LCD1 while controlling the refractive index in a cylindrical lens manner in the liquid crystal display device of the first embodiment, and the second liquid crystal display panel LCD2 is arranged to switch 2D display and 3D display. Further, the polarizing plate POL2 is arranged on the display surface side of the second substrate SUB22 forming the second liquid crystal display panel LCD2 to control the polarization direction of the display light transmitting through the second liquid crystal display panel LCD2 in the liquid crystal display device of the first embodiment. Accordingly, parallax images from the pixels corresponding to the right and left eyes of a viewer enter the corresponding opposed eyes even at the time of 3D display in the liquid crystal display device of the first embodiment. Thus, the generation of the crosstalk can be suppressed, and the image quality of 3D display can be significantly improved.

Further, as will be described later, when the linearly-polarized light from the polarizing plate POL1 transmits through the polarizing plate POL2, the transmission axis of the polarizing plate POL2 is arranged so as to reduce a loss of light, so that a decrease in the brightness caused by the arrangement of the polarizing plate POL2 can be minimized. Thus, even in the case where the second liquid crystal display panel LCD2 is turned on to perform 3D display, changes in the polarization direction by the second liquid crystal display panel LCD2 can be minimized. Accordingly, the transmissivity is hardly changed between 3D display and 2D display, and changes in the brightness between 2D display and 3D display can be minimized. Especially, it has been known that in the parallax barrier system using liquid crystal barriers, light is blocked and absorbed by barrier parts at the time of 3D display, and thus the brightness in 3D display is reduced to half the brightness or less at the time of 2D display.

Hereinafter, a liquid crystal display device having transmission axis angles related to the liquid crystal lens characteristics of the representative first transmission axis angle a1, second transmission axis angle a2, first rubbing angle b1, and second rubbing angle b2 is shown in each of first to fourth examples.

First Example

FIGS. 9A to 9D are diagrams for explaining a relation between the transmission axis angles and the rubbing angles in a first example in the liquid crystal display device according to the first embodiment of the present invention. It should be noted that in the liquid crystal display device of the first example, the first transmission axis angle a1, the second transmission axis angle a2, the first rubbing angle b1, and the second rubbing angle b2 are formed to be the same, namely, a1=a2=b1=b2.

The display light transmitting through the polarizing plate POL1, namely, the display light emitted from the first liquid crystal display panel LCD1 is linearly-polarized light. In this case, the first rubbing angle b1 and the first transmission axis angle a1 are formed to be the same in the configuration of the first example. Thus, when entering the liquid crystal layer LC2, the linearly-polarized display light does not become elliptically-polarized display light, but travels in the liquid crystal layer LC2 in a linearly-polarized state. As a result, the amount of display light entering the liquid crystal layer LC2 can be maximized after being emitted from the first liquid crystal display panel LCD1.

Further, the first rubbing angle b1 and the second rubbing angle b2 are formed to be the same in the configuration of the first example. Thus, the display light entering the liquid crystal layer LC2 can travel in the liquid crystal layer LC2 without changing the polarization direction. In addition, since the second rubbing angle b2 and the second transmission axis angle a2 are formed to be the same, the display light travelling in the liquid crystal layer LC2 in a linearly-polarized state is directly emitted as linearly-polarized display light through the polarizing plate POL2, and the display light transmitting through the polarizing plate POL2 can be maximized. On the other hand, of the display light whose polarization direction is changed or the display light that is elliptically polarized by the spacer beads SB or the disclination (disorder of liquid crystal distribution in areas overlapped with the pixel electrodes PX) at the time of 3D display when travelling in the liquid crystal layer LC2, only the display light components (polarization components of the display light) that are in parallel with the second transmission axis angle a2 pass through the polarizing plate POL2 to be emitted. Namely, of the light whose polarization direction is changed or the elliptically-polarized display light, the polarization components that are not in parallel with the second transmission axis angle a2 are absorbed by the polarizing plate POL2.

As described above, the linear polarization of the linearly-polarized display light entering the second liquid crystal display panel LCD2 can be held and allowed to pass through in the liquid crystal display device of the first example. Thus, the amount of display light passing through the second liquid crystal display panel LCD2 can be maximized, and the crosstalk contained in the display light irradiated from the second liquid crystal display panel LCD2 can be considerably reduced. As a result, the quality of 3D display can be improved while suppressing a decrease in the brightness when switching from 2D display to 3D display. Accordingly, it is the most preferable to form all of the first transmission axis angle a1, the second transmission axis angle a2, the first rubbing angle b1, and the second rubbing angle b2 of the first example to be the same in the single-domain liquid crystal display device.

It should be noted that the first transmission axis angle a1, the second transmission axis angle a2, the first rubbing angle b1, and the second rubbing angle b2 may be considered to be the same if effects on the transmissivity and crosstalk are small, for example, if they are in a range of ±1°.

Second Example

FIGS. 10A to 10D are diagrams for explaining a relation between the transmission axis angles and the rubbing angles in a second example in the liquid crystal display device according to the first embodiment of the present invention. It should be noted that first transmission axis angle a1>first rubbing angle b1≥0° and second transmission axis angle a2=second rubbing angle b2 are satisfied in the liquid crystal display device of the second example.

The first transmission axis angle a1 is larger than the first rubbing angle b1, namely, the first transmission axis angle a1 is different from the first rubbing angle b1. Thus, when the linearly-polarized display light transmitting through the polarizing plate POL1 enters the liquid crystal layer LC2, it becomes elliptically-polarized display light. In this case, the first rubbing angle b1 is formed to be smaller and the rubbing direction is configured to be nearly orthogonal to the extending direction of the pixel electrodes PX. Accordingly, the refractive index anisotropy of the liquid crystal layer LC2 can be effectively used. Thus, a difference between the refractive index near the pixel electrodes PX at the time of 3D display and the refractive index at an intermediate area between a pair of pixel electrodes PX can be made larger. As a result, the performance of the liquid crystal lenses by the second liquid crystal display panel LCD2 can be improved. Specifically, since the focal distance can be made shorter, it is possible to obtain particular effects in which the thickness of the second liquid crystal display panel LCD2 can be made thinner. Accordingly, it is preferable that the first rubbing angle b1 be formed to be small and the rubbing direction be configured to be nearly orthogonal to the extending direction of the pixel electrodes PX.

Further, if the first rubbing angle b1 is different from the second rubbing angle b2, the liquid crystal molecules of the liquid crystal layer LC2 are oriented in a twisted manner. Accordingly, the display light entering the liquid crystal layer LC2 travels in the liquid crystal layer LC2 while being rotated along a twist angle in accordance with the first rubbing angle b1 and the second rubbing angle b2, and then is emitted from the liquid crystal layer LC2.

Of the elliptically-polarized display light emitted from the liquid crystal layer LC2, only the display light with polarization components that are in parallel with the second transmission axis angle a2 is emitted through the polarizing plate POL2 pasted on the display surface side of the second substrate SUB22. Namely, the display light with polarization components that are not in parallel with the second transmission axis angle a2 is absorbed by the polarizing plate POL2 together with the display light whose polarization direction is changed by the spacer beads SB or by the disclination at the time of 3D display. In this case, since the second rubbing angle b2 and the second transmission axis angle a2 are formed to be the same in the configuration of the second example, the display light passing through the polarizing plate POL2 can be maximized, similarly to the first example.

Furthermore, the polarization components orthogonal to the second rubbing angle b2 are small in lens effects caused by the liquid crystal molecules of the liquid crystal layer LC2 at the time of 3D display, thus resulting in crosstalk. In this case, since the second rubbing angle b2 and the second transmission axis angle a2 are formed to be the same in the configuration of the second example, it is possible to obtain particular effects in which the polarization components causing the crosstalk of the display light at the time of 3D display can be absorbed by the polarizing plate POL2.

As described above, the crosstalk contained in the display light irradiated from the second liquid crystal display panel LCD2 can be considerably reduced by the polarizing plate POL2 even in the liquid crystal display device of the second example, and thus the quality of 3D display can be improved.

Third Example

FIGS. 11A to 11D are diagrams for explaining a relation between the transmission axis angles and the rubbing angles in a third example in the liquid crystal display device according to the first embodiment of the present invention. It should be noted that first transmission axis angle a1=first rubbing angle b1≥0° and first transmission axis angle a1=second transmission axis angle a2 are satisfied in the liquid crystal display device of the third example. In addition, second transmission axis angle a2>second rubbing angle b2≥0° is satisfied.

The first transmission axis angle a1 is larger than the first rubbing angle b1, namely, the first transmission axis angle a1 is different from the first rubbing angle b1. Thus, when the linearly-polarized display light transmitting through the polarizing plate POL1 enters the liquid crystal layer LC2, it becomes elliptically-polarized display light, similarly to the second example. In this case, the first rubbing angle b1 is formed to be smaller and the rubbing direction is configured to be nearly orthogonal to the extending direction of the pixel electrodes PX, similarly to the second example. Accordingly, the performance of the liquid crystal lenses by the second liquid crystal display panel LCD2 can be improved. Specifically, since the focal distance can be made shorter, it is possible to obtain particular effects in which the thickness of the second liquid crystal display panel LCD2 can be made thinner. Accordingly, it is preferable that the first rubbing angle b1 be formed to be small and the rubbing direction be configured to be nearly orthogonal to the extending direction of the pixel electrodes PX even in the third example.

The display light entering the liquid crystal layer LC2 is elliptically polarized in accordance with the first rubbing angle b1 and the second rubbing angle b2 to travel in the liquid crystal layer LC2. Of the elliptically-polarized display light emitted from the liquid crystal layer LC2, only the display light with polarization components that are in parallel with the second transmission axis angle a2 is emitted through the polarizing plate POL2 pasted on the display surface side of the second substrate SUB22. Further, the display light with polarization components that are not in parallel with the second transmission axis angle a2 is absorbed by the polarizing plate POL2 together with the display light whose polarization direction is changed by the spacer beads SB or by the disclination at the time of 3D display. In this case, the first transmission axis angle a1 and the second transmission axis angle a2 are formed to be the same in the configuration of the third example. Thus, the polarization components (crosstalk components) causing the crosstalk of the display light when passing through the second liquid crystal display panel LCD2 can be advantageously absorbed, and the crosstalk can be largely reduced. However, the second transmission axis angle a2 is different from the second rubbing angle b2. Thus, of the display light emitted from the liquid crystal layer LC2, the amount of light transmitting through the polarizing plate POL2 is reduced.

As described above, the crosstalk contained in the display light irradiated from the second liquid crystal display panel LCD2 can be considerably reduced by the polarizing plate POL2 even in the liquid crystal display device of the third example, and thus the quality of 3D display can be improved.

Fourth Example

FIGS. 12A to 12D are diagrams for explaining a relation between the transmission axis angles and the rubbing angles in a fourth example in the liquid crystal display device according to the first embodiment of the present invention. It should be noted that first transmission axis angle a1=first rubbing angle b1 and first rubbing angle b1≠second rubbing angle b2, and second rubbing angle b2=second transmission axis angle a2 are satisfied in the liquid crystal display device of the fourth example.

The display light transmitting through the polarizing plate POL1, namely, the display light emitted from the first liquid crystal display panel LCD1 is linearly-polarized light. In this case, the first rubbing angle b1 and the first transmission axis angle a1 are formed to be the same in the configuration of the fourth example. Thus, when entering the liquid crystal layer LC2, the linearly-polarized display light does not become elliptically-polarized display light, but travels in the liquid crystal layer LC2 in a linearly-polarized state. As a result, the amount of display light entering the liquid crystal layer LC2 can be maximized after being emitted from the first liquid crystal display panel LCD1.

Since the first rubbing angle b1 is different from the second rubbing angle b2 even in the fourth example, the orientation of the liquid crystal molecules of the liquid crystal layer LC2 is twisted. Accordingly, the display light entering the liquid crystal layer LC2 is rotated along a twist angle in accordance with the first rubbing angle b1 and the second rubbing angle b2, and travels in the liquid crystal layer LC2 while the polarization face of the linear polarization is rotated to be emitted from the liquid crystal layer LC2. The linearly-polarized display light emitted from the liquid crystal layer LC2 is emitted as display light through the polarizing plate POL2 pasted on the display surface side of the second substrate SUB22. In this case, since the second rubbing angle b2 and the second transmission axis angle a2 are formed to be the same, the display light travelling in the liquid crystal layer LC2 in a linearly-polarized state while the polarization face of the linear polarization is rotated is emitted as linearly-polarized display light with the same angle as the second transmission axis angle a2 through the polarizing plate POL2, and the display light transmitting through the polarizing plate POL2 can be maximized. On the other hand, of the display light whose polarization direction is changed or the display light that is elliptically polarized by the spacer beads SB or the disclination (disorder of liquid crystal distribution in areas overlapped with the pixel electrodes PX) at the time of 3D display when travelling in the liquid crystal layer LC2, only the display light components that are in parallel with the second transmission axis angle a2 pass through the polarizing plate POL2 to be emitted. The polarization components that are not in parallel with the second transmission axis angle a2 are absorbed by the polarizing plate POL2.

Accordingly, the crosstalk contained in the display light irradiated from the second liquid crystal display panel LCD2 can be considerably reduced by the polarizing plate POL2 even in the liquid crystal display device of the fourth example, and thus the quality of 3D display can be improved.

Further, in the liquid crystal display device of the fourth example, the second rubbing angle b2 on the display surface side of the second liquid crystal display panel LCD2 and the second transmission axis angle a2 same as the second rubbing angle b2 are appropriately set at a predetermined angle. Thus, the direction of the linear polarization can be set at a predetermined angle without decreasing the amount of display light entering the second liquid crystal display panel LCD2. For example, general polarized sunglasses are formed in such a manner that the transmission axis direction is vertical (90° relative to the X-direction in the drawing) relative to the horizontal surface. Thus, by setting the second transmission axis angle a2 at 70° to 90°, it is possible to obtain particular effects in which even a viewer wearing polarized sunglasses can view bright 3D and 2D images.

Further, the liquid crystal display device of the fourth example is formed with a second rubbing angle b2 (=second transmission axis angle a2) of about 30° to 60°, preferably, 45°, so that even a viewer wearing polarized sunglasses can view the display. Further, even in the case where a display device having the liquid crystal display device with the configuration of the fourth example is formed and a mechanism allowing the display part of the display device to rotate in the in-plane direction is provided, it is possible to obtain particular effects in which if the display part is rotated by 90° to be vertically placed, a viewer wearing polarized sunglasses can view the display image.

Second Embodiment

Figure 13:
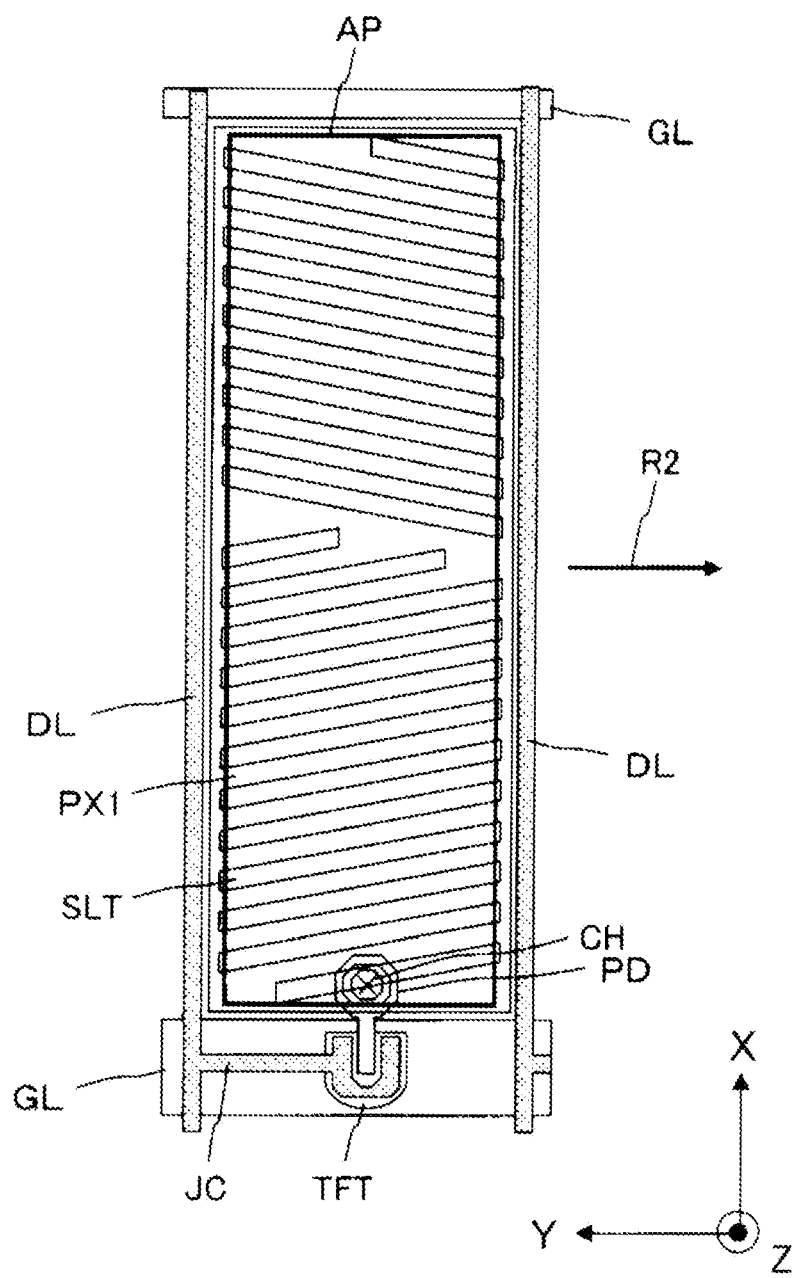
FIG. 13 is a plan view for explaining a configuration of a subpixel of a first liquid crystal display panel in a liquid crystal display device according to a second embodiment of the present invention.
Figure 14A:
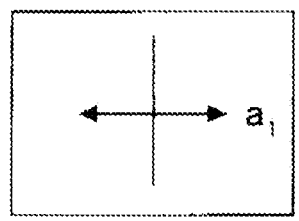
FIGS. 14A to 14D are outline views for explaining a relation between the transmission axis angles and the rubbing angles in a fifth example in the liquid crystal display device according to the second embodiment of the present invention.
Figure 14A:
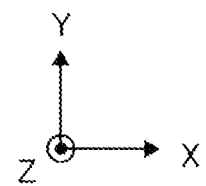
Figure 14B:
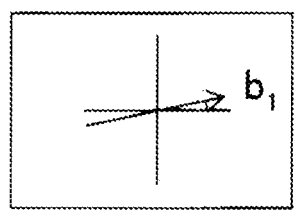
Figure 14C:
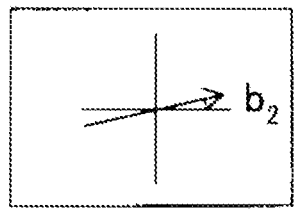
Figure 14D:
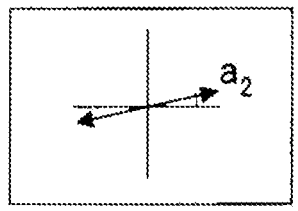
Figure 15A:
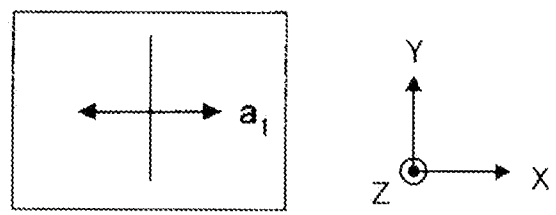
FIGS. 15A to 15D are outline views for explaining a relation between the transmission axis angles and the rubbing angles in a sixth example in the liquid crystal display device according to the second embodiment of the present invention.
Figure 15B:
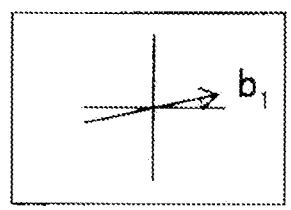
Figure 15C:
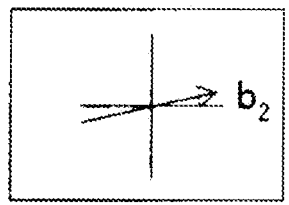
Figure 15D:
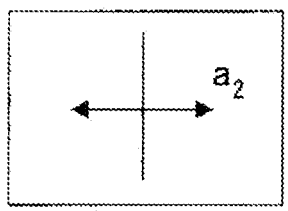
Figure 16A:
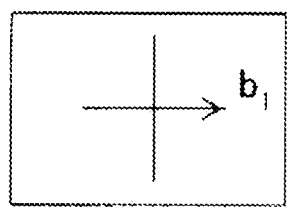
FIGS. 16A to 16D are outline views for explaining a relation between the transmission axis angles and the rubbing angles in a seventh example in the liquid crystal display device according to the second embodiment of the present invention.
Figure 16B:
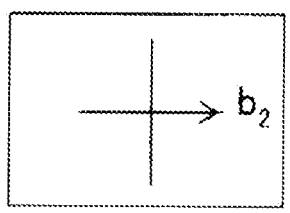
Figure 16C:
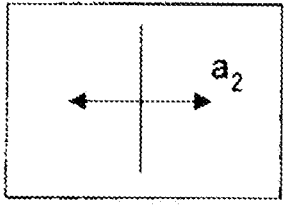
Figure 16D:
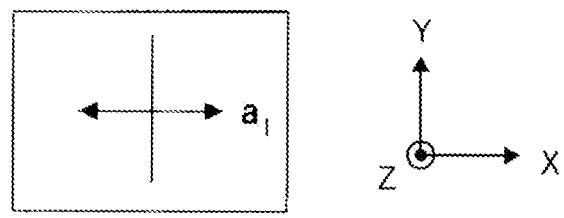

FIG. 13 is a top surface view for explaining a configuration of a subpixel of a first liquid crystal display panel in a liquid crystal display device according to a second embodiment of the present invention. Hereinafter, a structure of the subpixel in the liquid crystal display panel LCD1 of the second embodiment will be described on the basis of FIG. 13. However, only the linear electrodes PX1, the slits SLT, and the rubbing direction R2 are different in the first liquid crystal display panel LCD1 of the second embodiment, and the other configurations are the same as those of the first liquid crystal display panel LCD1 of the first embodiment. Accordingly, the linear electrodes PX1, the slits SLT, and the rubbing direction R2 will be described below in detail.

As shown in FIG. 13, the plural slits SLT intersecting with the X-direction are formed at parts corresponding to the passing areas AP of backlight for the linear electrodes PX1 of the liquid crystal display device according to the second embodiment, similarly to the first embodiment. With this configuration, linear (comb-like) electrodes overlapped with the common electrode CT are formed in the passing areas AP. Particularly, two areas one of which is closer to the thin-film transistor TFT and the other of which is far therefrom are provided in one subpixel area in the liquid crystal display device of the second embodiment, and the angles (inclined angles relative to the X-direction) of the slits SLT are formed to be different in the two areas. Accordingly, the inclined angles of the linear electrodes PX1 in the passing areas AP are different. In this case, in order to align the orientation directions (initial orientation directions) of the liquid crystal molecules in the two areas one of which is closer to the thin-film transistor TFT and the other of which is far therefrom, the rubbing process shown by the arrow R2 is performed. In such a multi-domain configuration, the transmissivity can be improved at an area where the slits SLT are formed, and the viewing angle dependency is eased. It should be noted that end portions of each slit SLT of the linear electrodes PX1 of the second embodiment are not opened. However, one end or both ends of each slit SLT may be opened, similarly to the first embodiment.

The second liquid crystal display panel LCD2 similar to the first embodiment is arranged on the display surface side of the first liquid crystal display panel LCD1 of the second embodiment with the above-described configuration. Thus, the effects same as the first embodiment can be obtained. Further, each subpixel has a multi-domain configuration in the first liquid crystal display panel LCD1 of the second embodiment, and thus the viewing angle dependency can be improved.

Hereinafter, a liquid crystal display device having transmission axis angles related to the liquid crystal lens characteristics of the representative first transmission axis angle a1, second transmission axis angle a2, first rubbing angle b1, and second rubbing angle b2 is shown in each of fifth to seventh examples. It should be noted that even in the fifth to seventh examples, the first transmission axis angle a1, the second transmission axis angle a2, the first rubbing angle b1, and the second rubbing angle b2 may be considered to be the same if effects on the transmissivity and crosstalk are small, for example, if they are in a range of ±1°.

Fifth Example

FIGS. 14A to 14D are diagrams for explaining a relation between the transmission axis angles and the rubbing angles in a fifth example in the liquid crystal display device according to the second embodiment of the present invention. It should be noted that the first transmission axis angle a1 is 0° because the liquid crystal display device of the second embodiment has a multi-domain configuration. Further, first transmission axis angle a1≠first rubbing angle b1 and first rubbing angle b1=second rubbing angle b2=second transmission axis angle a2 are satisfied in the liquid crystal display device of the fifth embodiment.

Since the first transmission axis angle a1 is different from the first rubbing angle b1, the linearly-polarized display light transmitting through the polarizing plate POL1 becomes elliptically-polarized display light when entering the liquid crystal layer LC2. In this case, the first rubbing angle b1 does not becomes 0°. Thus, it is possible to prevent domains form being generated near the pixel electrodes PX of the second liquid crystal display panel LCD2. Further, the first rubbing angle b1 and the second rubbing angle b2 are formed to be the same in the configuration of the fifth example. Thus, the display light entering the liquid crystal layer LC2 travels in the liquid crystal layer LC2 without changing the polarization direction, and is emitted from the liquid crystal layer LC2.

Of the elliptically-polarized display light emitted from the liquid crystal layer LC2, only the display light with polarization components that are in parallel with the second transmission axis angle a2 is emitted through the polarizing plate POL2 pasted on the display surface side of the second substrate SUB22. Namely, the display light with polarization components that are not in parallel with the second transmission axis angle a2 is absorbed by the polarizing plate POL2 together with the display light whose polarization direction is changed by the spacer beads SB or by the disclination at the time of 3D display. In this case, since the second rubbing angle b2 and the second transmission axis angle a2 are formed to be the same in the configuration of the fifth example, the display light passing through the polarizing plate POL2 can be maximized.

Furthermore, the polarization components orthogonal to the second rubbing angle b2 are small in lens effects caused by the liquid crystal molecules of the liquid crystal layer LC2 at the time of 3D display, thus resulting in crosstalk. In this case, since the second, rubbing angle b2 and the second transmission axis angle a2 are formed to be the same in the configuration of the fifth example, it is possible to obtain particular effects in which the polarization components causing the crosstalk of the display light at the time of 3D display can be absorbed by the polarizing plate POL2.

As described above, the crosstalk contained in the display light irradiated from the second liquid crystal display panel LCD2 can be considerably reduced by the polarizing plate POL2 even in the liquid crystal display device of the fifth example, and thus the quality of 3D display can be improved.

Sixth Example

FIGS. 15A to 15D are diagrams for explaining a relation between the transmission axis angles and the rubbing angles in a sixth example in the liquid crystal display device according to the second embodiment of the present invention. It should be noted that first transmission axis angle a1=second transmission axis angle a2=0°, first transmission axis angle a1≠first rubbing angle b1, first rubbing angle b1=second rubbing angle b2, and second rubbing angle b2≠second transmission axis angle a2 are satisfied in the liquid crystal display device of the sixth example.

The display light transmitting through the polarizing plate POL1, namely, the display light emitted from the first liquid crystal display panel LCD1 is linearly-polarized light. In this case, since the first rubbing angle b1 is different from the first transmission axis angle a1 even in the configuration of the sixth example similarly to the fifth example, the linearly-polarized display light transmitting through the polarizing plate POL1 becomes elliptically-polarized display light when entering the liquid crystal layer LC2. In this case, the first rubbing angle b1 does not become 0°. Thus, it is possible to prevent domains form being generated near the pixel electrodes PX of the second liquid crystal display panel LCD2. Further, the first rubbing angle b1 and the second rubbing angle b2 are formed to be the same in the configuration of the sixth example. Thus, the display light entering the liquid crystal layer LC2 travels in the liquid crystal layer LC2 without changing the polarization direction, and is emitted from the liquid crystal layer LC2.

Of the elliptically-polarized display light emitted from the liquid crystal layer LC2, only the display light with polarization components in parallel with the second transmission axis angle a2 is emitted through the polarizing plate POL2 pasted on the display surface side of the second substrate SUB22. Further, the display light with polarization components that are not in parallel with the second transmission axis angle a2 is absorbed by the polarizing plate POL2 together with the display light whose polarization direction is changed by the spacer beads SB or the disclination at the time of 3D display. In this case, the first transmission axis angle a1 and the second transmission axis angle a2 are formed to be the same, namely, formed at 0° in the configuration of the sixth example. Thus, the polarization components (crosstalk components) causing the crosstalk of the display light when passing through the second liquid crystal display panel LCD2 can be advantageously absorbed, and the crosstalk can be largely reduced. However, the second transmission axis angle a2 is different from the second rubbing angle b2. Thus, of the display light emitted from the liquid crystal layer LC2, the amount of light transmitting through the polarizing plate POL2 is reduced.

As described above, the crosstalk contained in the display light irradiated from the second liquid crystal display panel LCD2 can be considerably reduced by the polarizing plate POL2 even in the liquid crystal display device of the sixth example, and thus the quality of 3D display can be improved.

Seventh Example

FIGS. 16A to 16D are diagrams for explaining a relation between the transmission axis angles and the rubbing angles in a seventh example in the liquid crystal display device according to the second embodiment of the present invention. It should be noted that all of the first transmission axis angle a1, the second transmission axis angle a2, the first rubbing angle b1, and the second rubbing angle b2 are 0° in the liquid crystal display device of the seventh example. Namely, a1=a2=b1=b2=0° is satisfied.

The display light transmitting through the polarizing plate POL1, namely, the display light emitted from the first liquid crystal display panel LCD1 is linearly-polarized light. In this case, the first rubbing angle b1 and the first transmission axis angle a1 are formed at the same angle, namely 0° in the configuration of the seventh example. Thus, when entering the liquid crystal layer LC2, the linearly-polarized display light does not become elliptically-polarized display light, but travels in the liquid crystal layer LC2 in a linearly-polarized state. As a result, the amount of display light entering the liquid crystal layer LC2 can be maximized after being emitted from the first liquid crystal display panel LCD1.

Further, the first rubbing angle b1 and the second rubbing angle b2 are formed at the same angle, namely, 0° in the configuration of the seventh example. Thus, the display light entering the liquid crystal layer LC2 can travel in the liquid crystal layer LC2 without changing the polarization direction. In addition, the second rubbing angle b2 and the second transmission axis angle a2 are formed at the same angle, namely, 0°. Thus, the display light travelling in the liquid crystal layer LC2 in a linearly-polarized state is directly emitted as linearly-polarized display light through the polarizing plate POL2, and the display light transmitting through the polarizing plate POL2 can be maximized.

On the other hand, of the display light whose polarization direction is changed or the display light that is elliptically polarized by the spacer beads SB or the disclination (disorder of liquid crystal distribution in areas overlapped with the pixel electrodes PX) at the time of 3D display when travelling in the liquid crystal layer LC2, only the display light components (polarization components of the display light) that are in parallel with the second transmission axis angle a2 pass through the polarising plate POL2 to be emitted. Namely, of the light whose polarization direction is changed or the elliptically-polarized display light, the polarization components that are not in parallel with the second transmission axis angle a2 are absorbed by the polarizing plate POL2.

As described above, the linear polarization of the linearly-polarized display light entering the second liquid crystal display panel LCD2 can be held and allowed to pass through in the liquid crystal display device of the seventh example. Thus, the amount of display light passing through the second liquid crystal display panel LCD2 can be maximized, and the crosstalk contained in the display light irradiated from the second liquid crystal display panel LCD2 can be considerably reduced. As a result, the quality of 3D display can be improved while suppressing a decrease in the brightness when switching from 2D display to 3D display. Accordingly, it is the most preferable to form, all of the first transmission axis angle a1, the second transmission axis angle a2, the first rubbing angle b1, and the second rubbing angle b2 of the seventh example at the same angle, namely, 0° in the multi-domain liquid crystal display device.

Third Embodiment

Figure 17:
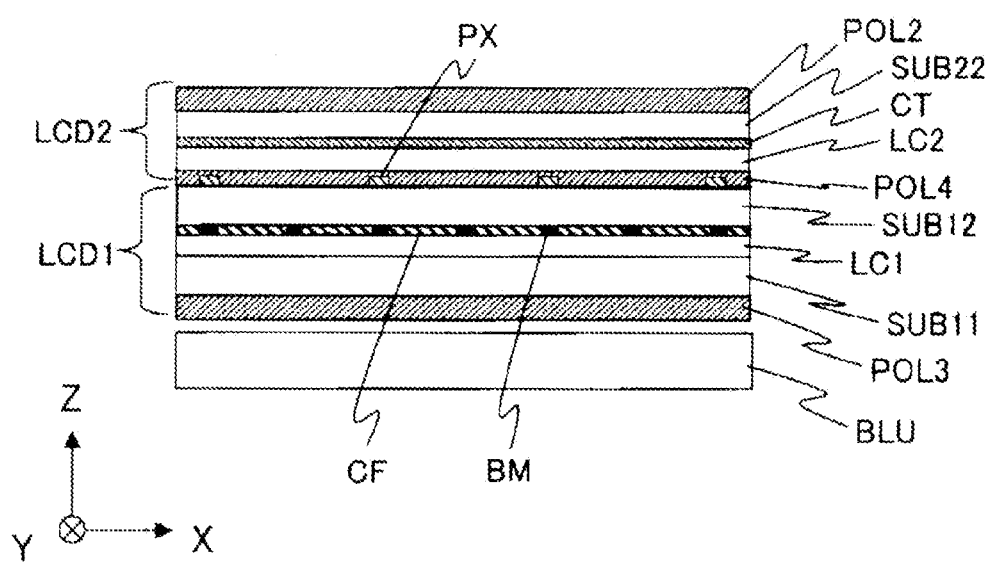
FIG. 17 is a cross-sectional view for explaining a configuration of a liquid crystal display device as a display device according to a third embodiment of the present invention.

FIG. 17 is a cross-sectional view for explaining an outline configuration of a liquid crystal display device as a display device according to a third embodiment of the present invention. In FIG. 17, configurations other than that in which comb electrodes PX and a polarizing plate POL4 are formed on the display surface side of the second substrate SUB12 configuring a first liquid crystal display panel LCD1 are the same as those of the first liquid crystal display panel LCD1 of the first embodiment.

As shown in FIG. 17, a polarizing plate POL3, a first substrate SUB11, a liquid crystal layer LC1, a second substrate SUB12, a liquid crystal layer LC2, a second substrate SUB22, and a polarizing plate POL2 are laminated in this order from the side of a backlight unit BLU in the configuration of the third embodiment. In the liquid crystal display device of the third embodiment having this configuration, the first substrate SUB11 and the second substrate SUB12 are arranged to face each other through the liquid crystal layer LC1 to form the first liquid crystal display panel LCD1. On the liquid crystal layer side of the second substrate SUB12, formed are color filters CF and black matrixes BM. On the display surface side of the second substrate SUB12 arranged on the display surface side of the first liquid crystal display panel LCD1, formed are the comb electrodes PX and the built-in polarizing plate POL4. On the second substrate SUB12 having this configuration, the second substrate SUB22 is arranged through the liquid crystal layer LC2 to form a second liquid crystal display panel LCD2. Specifically, the first liquid crystal display panel LCD1 and the second liquid crystal display panel LCD2 are formed, using one transparent substrate (second substrate SUB12) in the liquid crystal display device of the third embodiment.

On the display surface side of the second liquid crystal display panel LCD2 having this configuration, the comb electrodes PX and the built-in polarizing plate POL4 formed to cover the comb electrodes PX are formed. In addition, an oriented film (not shown) is formed to cover the surface of the built-in polarizing plate POL4. Such a built-in polarizing plate POL4 can be formed on the surface of the second substrate SUB12 using, for example, a coating-type polarizing plate or a wire grid polarizer. It should be noted that an oriented film (not shown) is formed on the surface of the common electrode CT formed in the second substrate SUB22, similarly to the first embodiment.

It has been known that such a built-in polarizing plate POL4 is small in the polarization degree as compared to that of a film-like polarizing plate that can be pasted on the outside of the liquid crystal display device. However, the polarizing plate POL2 is pasted on the display surface side of the second liquid crystal display panel LCD2 in the liquid crystal display device of the third embodiment, and display light transmitting through the built-in polarizing plate POL4 is further polarized in a desirable manner by the polarizing plate POL2. Accordingly, even in the case where the built-in polarizing plate POL4 is used, the polarization of the display light is performed in combination with the polarizing plate POL2. Thus, it is possible to obtain a higher polarization degree for the display light. As a result, it is possible to display with a high degree of contrast even in the configuration of the third embodiment. As described above, the polarizing plate POL2 is arranged on the display surface side of the second liquid crystal display panel LCD2 for performing lens operations in the present invention. Thus, in addition to the effects of the first embodiment, it is possible to obtain particular effects in which the built-in polarizing plate POL4 with a small polarization degree can be used.

Further, the film-like polarizing plate is not used in the liquid crystal display device of the third embodiment. Specifically, the first substrate SUB21, the polarizing plate POL1, and the hybrid resin ADH serving as adhesive material of the first embodiment are not necessary. Thus, the liquid crystal layer LC2 for lens operations and the liquid crystal layer LC1 for display operations can be arranged close to each other.

On the other hand, in the case where a distance (distance between the eyes) between the right and left eyes of a viewer is represented by E and a distance (viewing distance) between the display device and the viewer is represented by D, in order to separate the pixels for the right and left eyes viewing through lenticular lenses from each other by exactly the distance E between the eyes in the pixel pitch P (shown in FIG. 2) and the viewing distance D, an interval T (shown in FIG. 1) between the lens (liquid crystal layer LC2) and the display pixel (liquid crystal layer LC1) needs to be represented by the equation (3).

[Formula 3]

$$T = \frac{n_1 PD}{E} \quad (3)$$

Accordingly, in a display with the high definition of a display image and a small pixel pitch P, in order to view at the same distance as the case in which a display with a large pixel pitch P is used, the interval T between the lens and the display pixel, namely, the second substrate SUB12 or the first substrate SUB21 needs to be made thinner. However, there is a limit to making a substrate thinner in terms of the strength of the substrate. Further, a film-like polarizing plate has a thickness of about 100 μm or more. Thus, the distance T between the liquid crystal layer LC1 and the liquid crystal layer LC2 needs to be restricted.

On the contrary, the first substrate SUB21 of the first embodiment is not used in the liquid crystal display device of the third embodiment, and the built-in polarizing plate POL4 is formed in the second liquid crystal display panel LCD2. Accordingly, it is possible to obtain particular effects in which the distance T between the liquid crystal, layer LC1 and the liquid crystal layer LC2 can be shortened, and 3D display can be realized even on a display with the high degree of resolution and a small pixel pitch P.

Further, the focal position of the liquid crystal lens needs to match the liquid crystal layer LC1 of the first liquid crystal display panel LCD1. Here, in the case where the pitch of the liquid crystal lenses, namely, the pitch of the comb electrodes PX is represented by Q and the refractive index of the glass substrate is represented by n1, the cell gap d between the liquid crystal lenses is obtained by the following equation (4).

[Formula 4]

$$d \cong \frac{n_1 Q^2}{8 \Delta n T} \quad (4)$$

In particular, in the case of m (m is a natural number of 2 or larger) view points, Q≈mP is satisfied. When using the equation (3), the following equation (5) can be obtained.

[Formula 5]

$$\Delta n d \cong \frac{m^2 E}{8 D} P \quad (5)$$

Accordingly, if the pixel pitch P becomes small, the cell gap d or Δn (refractive index anisotropy) of liquid crystal can be made smaller. As described above, it is possible to obtain effects in which the response speed can be made smaller by reducing the cell gap.

It should be noted that even in the case where a thin-film polarizing plate such as a coating-type polarizing plate or a wire grid polarizer is used for the polarizing plate POL1 in the first embodiment, it is possible to similarly obtain effects in which the cell gap d or Δn (refractive index anisotropy) of liquid crystal can be reduced in accordance with the reduced thickness of the polarizing plate.

Fourth Embodiment

Figure 18:
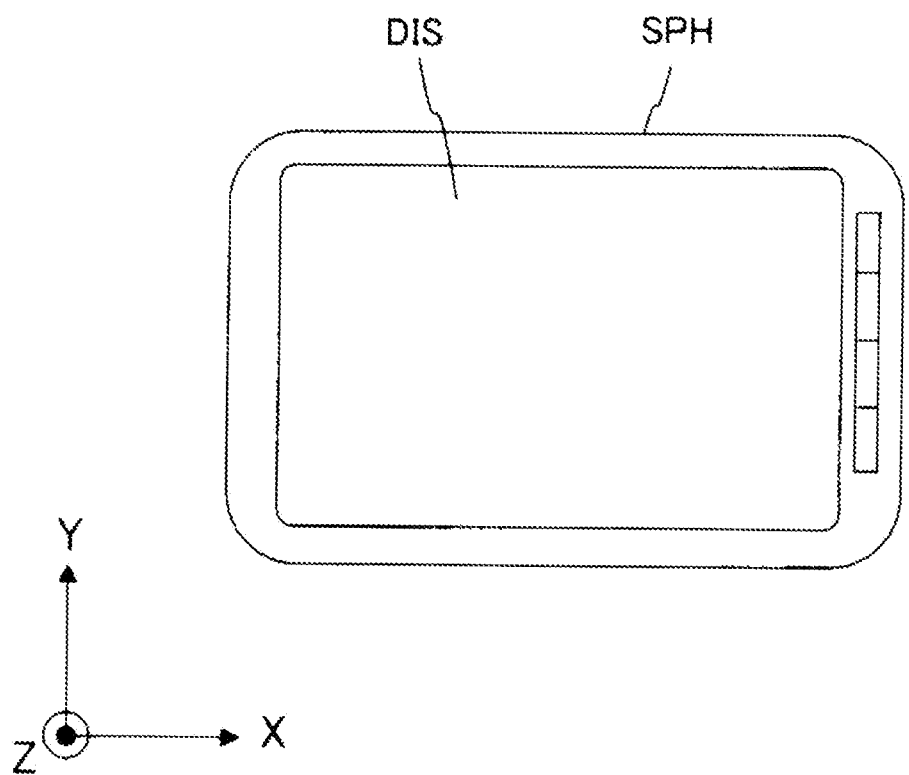
FIG. 18 is an outline view for explaining a configuration of an information device having the display device of the present invention.

FIG. 18 is a diagram for explaining an outline configuration of an information device having the display device of the present invention. Particularly, FIG. 18 shows a case in which the display device of the present invention is used for a handheld terminal.

As shown in FIG. 18, a display device DIS of the present invention is applied to a handheld terminal SPH such as a smartphone or a portable game device, so that it is possible to prevent crosstalk from being generated even in the case where 3D display is performed at a lateral position in which the longitudinal direction is in the horizontal direction. As a result, the image quality can be improved at the time of 3D display.

The invention achieved by the inventors has been concretely described above on the basis of the embodiments of the present invention. However, the present invention is not limited to the embodiments of the present, invention, but can be variously changed without departing from the scope of the present invention.

What is claimed is:

1. A display device comprising:
a display panel that displays an image; and
a liquid crystal lens panel that is arranged on a display surface side of the display panel and switches 2D display and 3D display,
wherein the liquid crystal lens panel includes:
a first transparent substrate that is arranged on the display surface side of the display panel;
a second transparent substrate that is arranged to face the first transparent substrate through a liquid crystal layer;
wherein a first polarizing plate that is formed on a display surface side of the second transparent substrate to control a polarization direction of light transmitting through the liquid crystal layer;
wherein a second polarizing plate that is formed between the first transparent substrate and the display panel;
wherein a first oriented film is formed on a liquid crystal layer side of the first transparent substrate, and a second oriented film is formed on a liquid crystal layer side of the second transparent substrate; and
wherein $a1 \neq 0°$ and $a1=a2=b1=b2$ are satisfied in which a transmission axis direction of the first polarizing plate is $a1$, a transmission axis direction of the second polarizing plate is $a2$, a first orientation direction is $b1$, and a second orientation direction is $b2$.

2. The display device according to claim 1, wherein the first polarizing plate is smaller than the second polarizing plate in the polarization degree.

3. The display device according to claim 1, wherein the first polarizing plate is larger than the second polarizing plate in the polarization degree.

4. The display device according to claim 2, wherein the second polarizing plate is a polarizing plate arranged between the liquid crystal lens panel and the display panel.

5. The display device according to claim 3, wherein the second polarizing plate is a polarization layer formed on the liquid crystal surface side of the first transparent substrate forming the liquid crystal lens panel.

6. The display device as in claim 1, wherein the display panel includes a liquid crystal display panel having a pair of transparent substrates that are arranged to face each other through the liquid crystal layer, and a backlight unit that is arranged on the rear surface side of the liquid crystal display panel.

7. A display device comprising:
a display panel that displays an image; and
a liquid crystal lens panel that is arranged on a display surface side of the display panel, and switches 2D display and 3D display,
wherein the liquid crystal lens panel includes:
a first transparent substrate that is arranged on the display surface side of the display panel;
a second transparent substrate that is arranged to face the first transparent substrate through a liquid crystal layer;
wherein a first polarizing plate that is formed on a display surface side of the second transparent substrate to control a polarization direction of light transmitting through the liquid crystal layer;
wherein a second polarizing plate that is formed between the first transparent substrate and the display panel;
wherein a first oriented film is formed on a liquid crystal layer side of the first transparent substrate, and a second oriented film is formed on a liquid crystal layer side of the second transparent substrate; and
wherein $a1=a2=b1=b2=0°$ is satisfied in which a transmission axis direction of the first polarizing plate is $a1$, a transmission axis direction of the second polarizing plate is $a2$, a first orientation direction is $b1$, and a second orientation direction is $b2$.

8. The display device according to claim 7, wherein the first polarizing plate is smaller than the second polarizing plate in the polarization degree.

9. The display device according to claim 7, wherein the first polarizing plate is larger than the second polarizing plate in the polarization degree.

10. The display device according to claim 8, wherein the second polarizing plate is a polarizing plate arranged between the liquid crystal lens panel and the display panel.

11. The display device according to claim 9, wherein the second polarizing plate is a polarization layer formed on the liquid crystal surface side of the first transparent substrate forming the liquid crystal lens panel.

* * * * *

UNITED STATES PATENT AND TRADEMARK OFFICE
CERTIFICATE OF CORRECTION

| | |
|---|---|
| PATENT NO. | : 9,332,250 B2 |
| APPLICATION NO. | : 13/568929 |
| DATED | : May 3, 2016 |
| INVENTOR(S) | : Tatsuya Sugita et al. |

It is certified that error appears in the above-identified patent and that said Letters Patent is hereby corrected as shown below:

In the specification
Column 4, line 19, change "SDB11" to --SUB11--;
Column 7, line 52, change "equalised" to --equalized--;
Column 8, line 5, change "crystal, display" to --crystal display--;
Column 8, line 19, change "polarisation" to --polarization--;
Column 8, line 54, change "panel. LCD2" to --panel LCD2--;
Column 9, line 1, change "foe" to --be--;
Column 9, line 37, change "recognise" to --recognize--;
Column 9, line 39, change "polarisation" to --polarization--;
Column 11, line 43, change "represented, as" to --represented as--;
Column 12, line 50, change "crystal, layer" to --crystal layer--;
Column 16, line 6, change "eliiptically-polarized" to --elliptically-polarized--;
Column 16, line 24, change "from, the" to --from the--;
Column 20, line 52, change "second, rubbing" to --second rubbing--;
Column 22, line 30, change "polarising" to --polarizing--;
Column 22, line 46, change "form, all" to --form all--;
Column 24, line 27, change "crystal, layer" to --crystal layer--; and
Column 25, line 19, change "present, invention" to --present invention--.

Signed and Sealed this
Ninth Day of August, 2016

Michelle K. Lee
*Director of the United States Patent and Trademark Office*